(12) United States Patent
Ding

(10) Patent No.: US 10,255,335 B2
(45) Date of Patent: Apr. 9, 2019

(54) DATABASE WORKLOAD ANALYSIS AND OPTIMIZATION VISUALIZATIONS

(71) Applicant: Cloudera, Inc., Palo Alto, CA (US)

(72) Inventor: Yihua Ding, Sunnyvale, CA (US)

(73) Assignee: Cloudera, Inc., Palo Alto, CA (US)

( * ) Notice: Subject to any disclaimer, the term of this patent is extended or adjusted under 35 U.S.C. 154(b) by 169 days.

(21) Appl. No.: 15/345,375

(22) Filed: Nov. 7, 2016

(65) Prior Publication Data

US 2017/0132296 A1  May 11, 2017

Related U.S. Application Data

(60) Provisional application No. 62/252,404, filed on Nov. 6, 2015.

(51) Int. Cl.
*G06F 17/30* (2006.01)

(52) U.S. Cl.
CPC .............................. *G06F 17/30554* (2013.01)

(58) Field of Classification Search
CPC .................................................. G06F 17/30554
See application file for complete search history.

(56) References Cited

U.S. PATENT DOCUMENTS

| | | | |
|---|---|---|---|
| 6,957,225 B1 * | 10/2005 | Zait | G06F 17/3033 |
| 2001/0044795 A1 * | 11/2001 | Cohen | G06F 17/30699 |
| 2003/0037034 A1 * | 2/2003 | Daniels | G06Q 10/087 |
| 2005/0055357 A1 * | 3/2005 | Campbell | G06F 8/61 |
| 2011/0196857 A1 * | 8/2011 | Chen | G06F 17/30457 707/714 |
| 2013/0080416 A1 * | 3/2013 | Meade | G06F 17/30442 707/713 |
| 2013/0159333 A1 * | 6/2013 | Assam | G06F 17/30386 707/758 |
| 2015/0178366 A1 * | 6/2015 | Farahbod | G06F 17/30306 707/603 |
| 2016/0224616 A1 * | 8/2016 | Beacom | G06F 17/30486 |

\* cited by examiner

*Primary Examiner* — Jay A Morrison
(74) *Attorney, Agent, or Firm* — Perkins Coie LLP

(57) ABSTRACT

Techniques are described for analyzing usage of data stored in a data storage system without accessing the stored data. In some embodiments, workload data indicative of queries executed at the data storage system on stored data is received. This workload data can include query logs generated during execution of the queries. The workload data is processed to identify data elements such as tables, columns, and views associated with the stored data as well as information regarding usage of the identified data elements. Usage can include operations performed on the data elements during execution of the queries. Based on this processing relationships between the identified data elements can be inferred and visualizations generated that convey information regarding usage of the data stored at the data storage system. Visualizations can include, among others, usage heatmap diagrams, join diagrams, column family diagrams, filter diagrams, view lineage diagrams, data flow diagrams, denormalization diagrams, and workload distribution diagrams.

31 Claims, 19 Drawing Sheets

DATABASE WORKLOAD ANALYSIS AND OPTIMIZATION VISUALIZATIONS

CROSS-REFERENCE TO RELATED APPLICATION(S)

The present application claims the benefit under 35 U.S.C. 119(e) of U.S. Provisional Application No. 62/252,404, titled "DATABASE WORKLOAD ANALYSIS PLATFORM," filed Nov. 6, 2015, the contents of which are hereby incorporated by reference in their entirety.

TECHNICAL FIELD

At least one embodiment of the present disclosure pertains to information organization and understanding, and more particularly, to generating and displaying visualizations based at least in part on workload data associated with queries performed in a data storage environment.

BACKGROUND

Data acquisition and analysis is increasingly becoming a critical driver in the success of enterprise organizations across many sectors. Further, the storage of data is becoming cheaper and more plentiful. This increase in capability to store vast amounts of data has led to fewer incentives for organizations to discard any of that data. Managing, accessing, and analyzing the data can be time consuming and computationally expensive. In a typical enterprise data warehouse system data processing workloads (e.g. ETL/ELT, BI, self-service BI) generate huge volumes of queries. Some systems can generate millions of queries in a given day.

BRIEF DESCRIPTION OF THE DRAWINGS

The present embodiments are illustrated by way of example and are not intended to be limited by the figures of the accompanying drawings. In the drawings.

DETAILED DESCRIPTION

From the foregoing, it will be appreciated that specific embodiments of the invention have been described herein for purposes of illustration, but that various modifications may be made without deviating from the scope of the invention. Accordingly, the invention is not limited except as by the appended claims.

Overview

The business intelligence (BI) industry has demonstrated that analytics is moving to a self-service model. The ability for end-users to find and analyze their own data makes teams more productive, companies more agile and frees BI experts for more value-added tasks. As storage capacity becomes progressively cheaper and more plentiful, there are fewer incentives to discard these gathered data and many reasons to retain as much data as possible. This increasingly plentiful storage capacity is making it feasible to store massive quantities of data for later analysis. Managing, accessing, and analyzing such data utilizes valuable computing resources however. In a typical enterprise data warehouse system data processing workloads (e.g. ETL/ELT, BI, self-service BI) generate huge volumes of queries. Some systems can generate millions of queries in a given day. Such queries can often be very complex. Enterprises analyze their data to gain insight into their business operations, but often have no clear insight into how that data is being utilized. Without understanding how their data is utilized, enterprises are unable to make informed decisions on how to manage their data. For example, to address processing bottlenecks, a database administrator may wish to migrate some of the workload to a distributed storage and processing system such as Hadoop™. Without insight into how the data is organized and used, a database administrator is left to guess whether such a migration will be beneficial.

Figure 1:
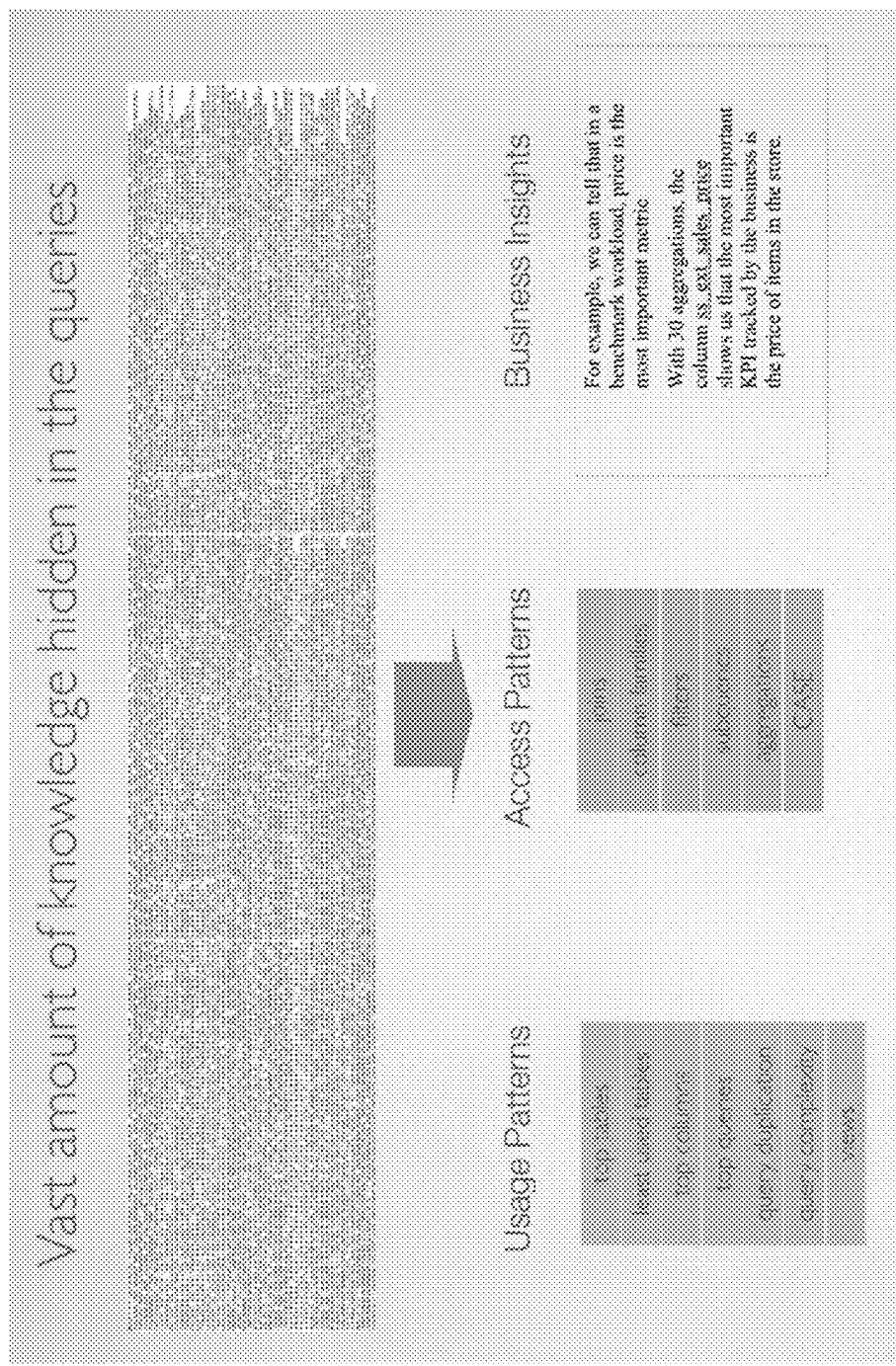
FIG. 1 illustrates at a high level the extraction of insights from workload data based on queries.

To address these issues, techniques are described herein for analyzing existing workloads (as opposed to the underlying data), and presenting insights, for example in the form of visualizations, into the data and how the data is being utilized. There are vast amounts of valuable information hidden in the queries associated with various workload processes. FIG. 1 illustrates this concept at a high level. Workload data, for example in the form of query logs, can be difficult for humans (even those with technical expertise) to decipher due at least in part to the massive volume of information. Instead, techniques are described herein for interpreting workload data and presenting insights in easy to understand graphical outputs that effectively convey information even to those users that are not highly technical.

In an embodiment, systems are described for analyzing existing workloads, interpreting the workloads based on the analysis to discover insights, and presenting those insights in an easy to understand graphical manner. In some embodiments insights can include, for example, certain access and usage patterns for the data. In some cases these insights can be utilized to provide data strategy recommendations. For example, through the use of intuitive graphical interfaces, users can receive guidance on where to focus development efforts to achieve the greatest impact, centered around identifying duplication, exposing complexity, and leveraging compatibilities with ecosystem tools such as Impala™ and Hive™.

Operating Environment

Figure 2:
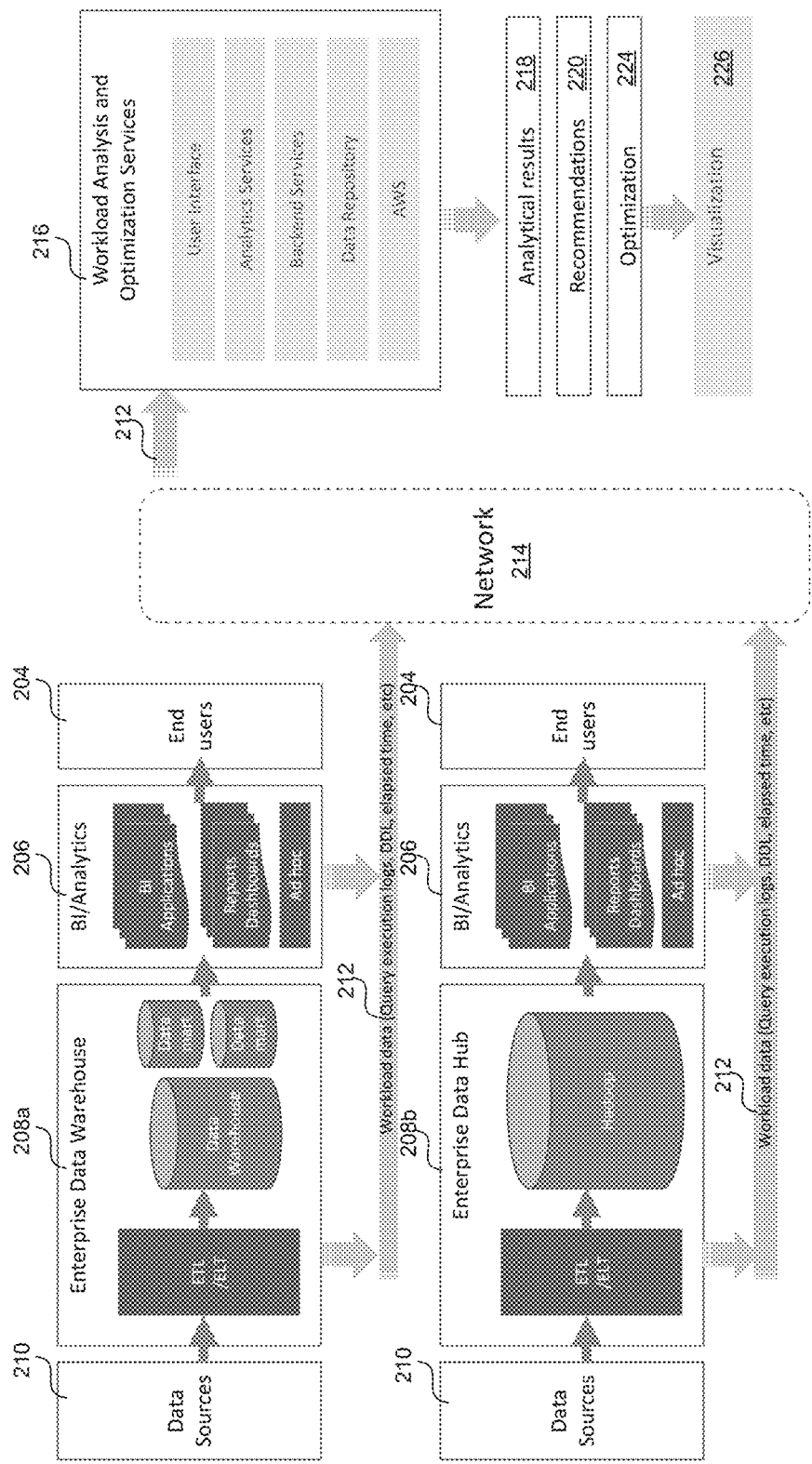
FIG. 2 is an architecture diagram illustrating an example operating environment.

FIG. 2 is an architecture diagram illustrating an example operating environment within which the certain embodiments of the techniques described herein can be implemented.

In general data from one or more data sources 210 can be stored at some type of data storage system, for example an enterprise data warehouse 208a or an enterprise data hub 208b. Data sources 210 broadly represent any distinct or set of data sources that can be consumed by the systems described with respect to FIG. 2. Examples of data sources 210 include, without limitation, data files, directories of files, configuration files, event logs (e.g. server logs, network logs, etc.), messages, performance metrics, sensor data, network traffic, etc. As suggested in FIG. 2, data from sources 210 may in some cases be brought into the data storage system through using an ETL (extract, transform, load) and/or ELT (extract, load, transform) process. Alternatively or in addition, in some embodiments, raw data from sources 210 may be stored at the data storage system.

As mentioned, data storage systems may include an enterprise data warehouses 208a and/or an enterprise data hub 208b that may be part of a distributed computing cluster. Enterprise data warehouse 208a broadly represents any type of enterprise-managed data storage system including, without limitation, databases, data warehouses, data marts, repositories, etc. These systems can, in some embodiments, be configured to store data brought in from sources 210 as structured tabular data. Enterprise data warehouse 208a may include a database management system (DBMS) including such as MySQL, SQL Server, Oracle, and so forth. In variations, enterprise data 124 can be implemented and managed by a distributed database management system, an object-oriented database management system (OODBMS), an object-relational database management system (ORDBMS), a file system, a NoSQL or other non-relational database system, and/or any other suitable database management package. Enterprise data hub 208b broadly represents storage in a distributed computing cluster that may or may not include clients other than a particular enterprise organization. For example, enterprise data hub 208b may include a Hadoop™ distributed computing system implementing a Hadoop Distributed File System (HDFS).

Users 204 can access data stored at systems 208a-b, for example for analytics, using one or more client tools (206) via client computing devices (not shown). Users 204 in this context may be employees of an enterprise organization that are accessing the organization's data for any purpose. For example, a business manager may wish to analyze an enterprise organization's sales figures for the past fiscal year and may do so by using any number of business intelligence tools via a client device. Client devices used to access data stored at systems 208a-b can any system and/or device, and/or any combination of devices/systems that are able to establish a connection with another device, a server and/or other systems. Examples of the client devices can include computing devices such as mobile or portable devices or non-portable devices. Non-portable devices can include a desktop computer, a computer server or cluster. Portable devices can including a laptop computer, a mobile phone, a smart phone, a personal digital assistant (PDA), a handheld tablet computer. Tools 206 may include applications or other software tools including without limitation, general data analytics tools, business/operational intelligence tools (e.g. Yellowfin™, Tableau™, etc.), database management tools, ad-hoc query tools (e.g. SQL query software), etc. Tools 206 may in some cases be instantiated as at client devices or may be accessed via a computer network from remote service providers. In either case, access by users 204 of data stored at systems 208a-b results in workload, generally in the form of queries executed at the systems.

Execution of a query at data storage systems 208a-b results in workload data 212 that includes information indicative of the generation and execution of the query, but does not necessarily include the underlying data on which the query is based (i.e. the data stored at systems 208a-b). Examples of workload data 212 include, without limitation, query execution logs (or any other logs), data definition language scripts, or any other data generated or utilized by computing systems associated with the generation and execution of queries. For example workload data 212 may be generated by computing devices used by end user 204 that are executing tools 206. Similarly workload data may be generated by computing devices operating as part of either storage system 208a or 208b.

As previously mentioned, the techniques described herein are based on analysis of the workload data 212 as opposed to the underlying enterprise data (i.e. that stored at systems 208a-b) upon which the workload data 212 is based. According to some embodiments, functionalities described herein may be offered to users via a software as a service (SAAS) solution. For example, as shown in FIG. 2, an example workload analysis and optimization services 216 may include multiple services, including a front user interface, analytics services, backend services. In general the described services may be provided through the use of software executing at one or more host server devices (not shown) and accessible to users via one or more network connected client devices (also not shown). In some embodiments software to provide such services can be instantiated at one physical host server device or distributed across multiple physical and/or virtual devices. In some embodiments, one or more of these services may be hosted on top of a third-party cloud computing platform with a flexible and scalable architecture such as Amazon AWS™. The services shown as part workload analysis and optimization services 216 in FIG. 2 are provided for illustrative purposes and are not to be construed as limiting. Other embodiments may include fewer or more services than as shown. Further, the SAAS system depicted in FIG. 2 is an example provided for illustrative purposes. In other embodiments, all of the functionalities described herein may be provided by software instantiated at a client device.

Network 214 can be any collection of distinct networks operating wholly or partially in conjunction to provide connectivity to the client devices, the host servers, and any other devices operating in the environment depicted in FIG. 2. In one embodiment, communications to and from the client devices can be achieved by an open network, such as the Internet, or a private network, such as an intranet and/or the extranet. For example, the Internet can provide file transfer, remote log in, email, news, RSS, cloud-based services, instant messaging, visual voicemail, push mail, VoIP, and other services through any known or convenient protocol, such as, but is not limited to, the TCP/IP protocol, Open System Interconnection (OSI) protocols, and so forth. In one embodiment, communications can be achieved by a secure communications protocol, such as secure sockets layer (SSL), or transport layer security (TLS).

In an embodiment, host servers providing workload analysis and optimization services 216 may employ suitable mechanisms to actively download, pull, or crawl the workload data 212 generated based on activity at data storage systems 208a-b. In other embodiments this workload data 212 may be pushed to and passively received at host server devices providing services 216.

As will be described in more detail, workload analysis and optimization services 216 can be utilized to generate analytical results 218, recommendations 220, and optimization information 224 based on analysis of the workload data 212. Further generated information may be intuitive presented to users via one or more visualizations 226, for example, displayed via a display of a client device.

Example Workload Analysis Process

Figure 3:
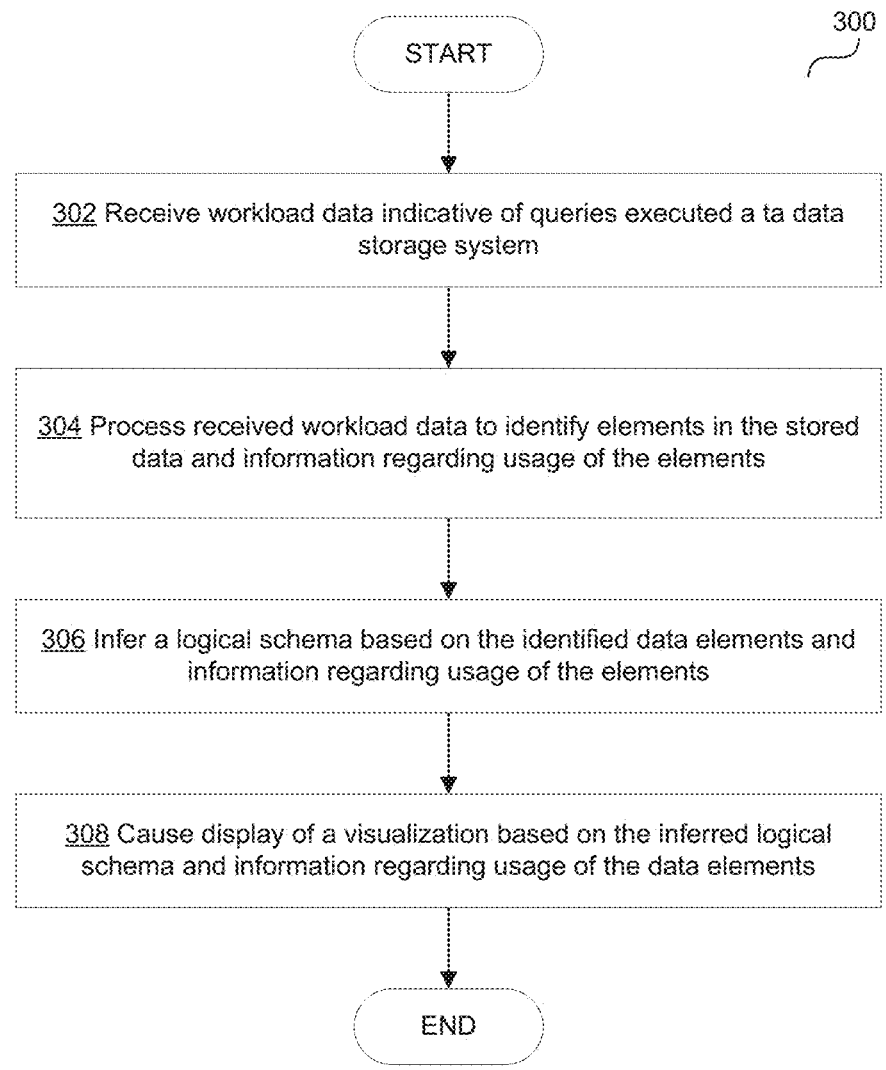
FIG. 3 is a flow chart of an example process for analyzing workload data.

FIG. 3 illustrates at a high level an example process 300 for analyzing workload data 212 according to some embodiments. As previously mentioned, process 300 may be performed by one or more host server devices and/or client devices implementing services 216. As shown in FIG. 3, process 300 begins at step 302 with receiving workload data 212 from one or more data storage systems 208a-b. As mentioned, workload data 212 is indicative of queries executed on data stored at the data storage systems 208a-b.

Process 300 continues as step 304 with processing the workload data 212 to identify elements associated with the stored data and information regarding usage of those elements. For example, in the context of tabular data, identified elements may include, without limitation, tables as well as columns and rows (i.e. fields) associated with those tables. Note however, that the workload data may not include the values associated with these elements. So for example, by analyzing workload data 212, a system in accordance with the present teaches may determine that a data storage system 208a-b includes data stored as a plurality of tables A, B, C, and D. Each of these tables may include identifying information such as a table name and may be of a certain type (e.g. a fact table vs. a dimensional table). Further, each of the tables may include data stored in the form of values organized in a plurality of fields such (e.g. columns). Similarly, each column may include an associated identifier such as a column name.

Process 300 continues at step 306 with inferring a logical schema based on data elements and usage information identified through the processing of the workload data 212. In this context, "inferring a logical schema" may simply refer to identifying a relationship between one or more data elements. As previously explained, even without access to the underlying data, workload data indicative of queries performed on the underlying data can provide valuable insight into how the data is organized and used. Any single piece of workload data (for example a log generated based on a single query) may provide just a limited insight into the structure and usage of the data stored at systems 208a-b. For example, a single query log entry, may include information indicating that a query was executed at system 208a-b that included an operation joining columns identified as "A1"-"A2" in a table identified as "A" to columns "C3"-"C4" in a table identified as "C." Without this limited information not much insight is gained except that the underlying data includes two tables identified as A and C and that a user executed a query that included an operation joining data from columns in the two tables. However, a typical data storage system 208a-b may generated millions of such query entries based on such usage. By analyzing large volumes of this workload data 212, greater insights can be gathered. With reference to FIG. 1, usage and access patterns may be identified from which inferences can be made regarding relationships between certain identified elements (e.g. between tables, between columns, etc.).

Process 300 concludes at step 308 with causing display of visualizations based on the insights gathered at steps 304 and 306. In some embodiments, visualizations may simply provide statistical usage information to a user. In some embodiments, visualizations may include inferred relationships and usage patterns. In some embodiments, visualizations may include optimization assessments and recommendations. Described herein are a series of different types of visualizations that may be implemented in certain embodiments. It shall be appreciated that each of the visualization types described herein may be implemented independently to each other. That is to say that some embodiments may include more or fewer visualization options. Further the visualizations shown in the figures are examples provided for illustrative purposes and are not to be construed as limiting. Other embodiments may include visualizations that include more or fewer graphical elements or that arrange the graphical elements in different configurations than as shown in the figures.

Usage Heatmap Diagram

Figure 4A:
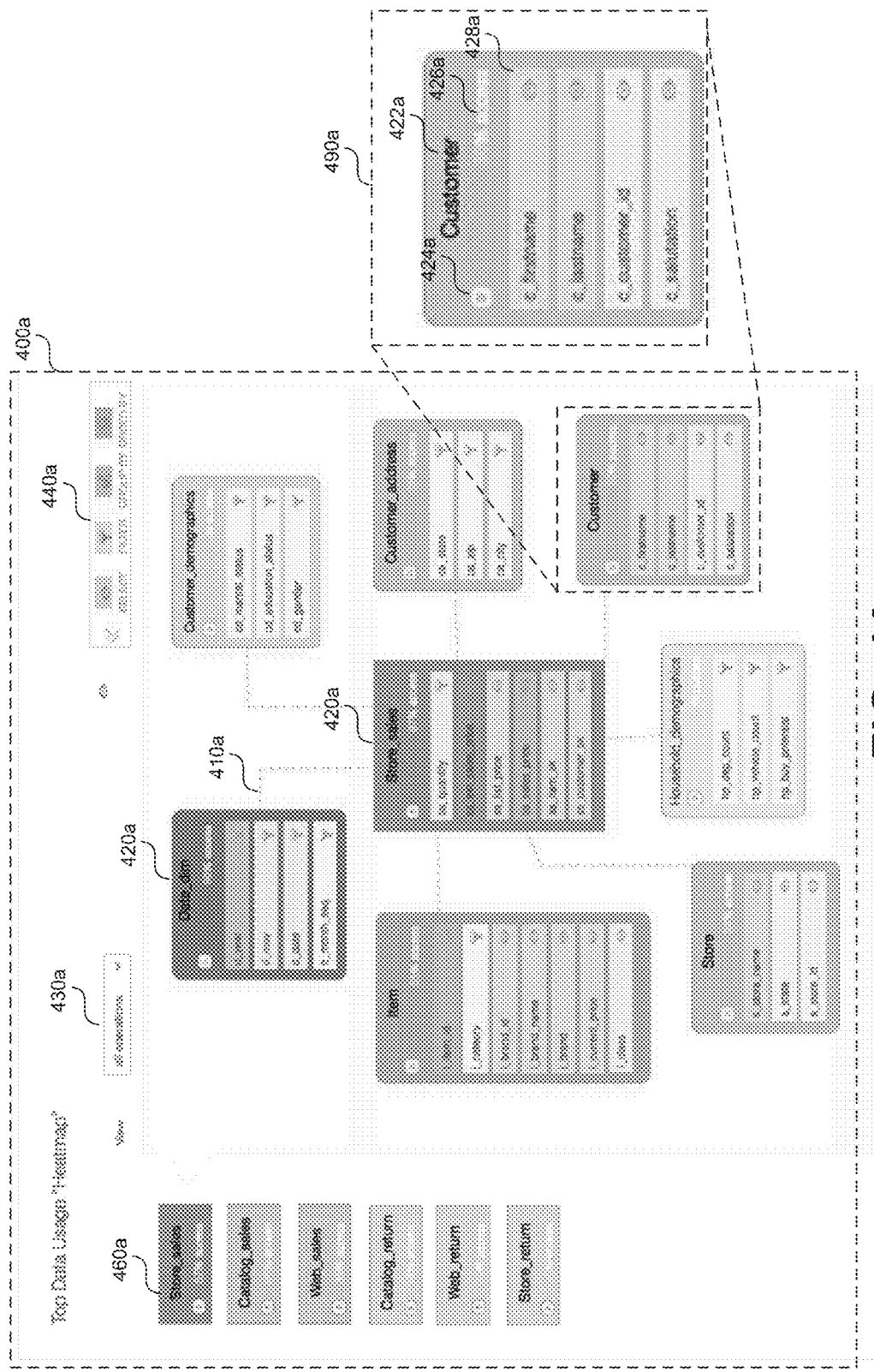
FIGS. 4A and 4B show screen captures of example usage heatmap diagrams.
Figure 4B:
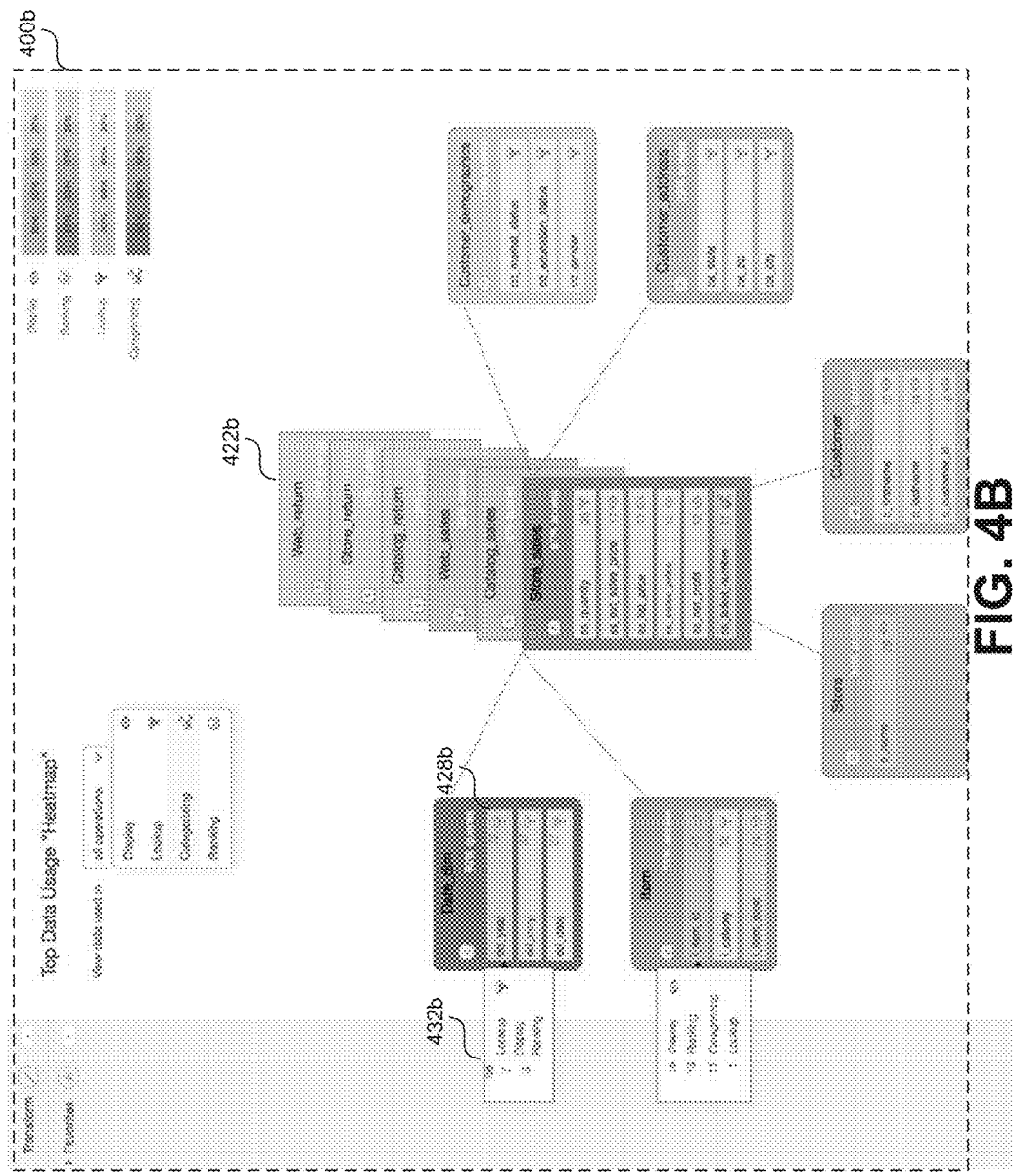

FIGS. 4A-4B are screen captures of example visualizations in the form of "usage heatmap diagrams," that may be displayed to users in some embodiments. FIG. 4A shows a first example visualization 400a in the form of a usage heatmap diagram. As shown in FIG. 4A, visualization 400a can include one or more table nodes 420a that are representative of tables present in the data stored at storage systems 208a-b according to the inferred logical schema. Each table node 420a is displayed as a graphical element in visualization 400a. In one embodiment, the table nodes 420a are displayed as a rectangular objects, however other shapes may be used in other embodiments. Table nodes 420a may be visually linked in visualization 400a to indicate relationships (e.g. as inferred based on the workload data 212) between the tables represented by nodes 420a. For example, table nodes 420a can be visually linked with a dotted line 410a or any other type of visual que to indicate a link between nodes.

FIG. 4A shows as detail 490a of an example table node 420a. As shown in detail 490a, a table node 420a may include identifying information associated with the table represented by the node 420a. For example, the identifying information may include a name of the table 422a (e.g. "Customer" in detail 490a) and/or an indication 424 of the type of the table. For example, as previously mentioned, in many cases, tables can generally be categorized as being either fact tables or dimension tables. The table node 420a shown in detail 490a, for example, is a dimension table as indicated by an icon 424a labeled, "D." A fact table, on the other hand may be indicated by an icon labeled "F." Note that in some embodiments, the type of table may be explicitly indicated in the workload data 212, for example in the form of metadata. Alternatively, such information may be inferred, for example based on the name of the table and/or the names of columns associated with the table. For example, the table node 420a shown in detail 490 is titled "Customer" and includes columns such as "c_firstname," c_lastname," etc. In general a dimension table will include textual value columns that are descriptive of some attribute (e.g. the name of a particular customer), whereas fact tables usually will include facts in the form of numerical values associated with some measure (e.g. number of sales). Here, based at least in part due to the names of the columns associated with the "customer" table, it can be inferred that this table is a dimension table. In some embodiments, table nodes 420a may also display information related to usage of the table. For example, as shown in detail 490a, a table node 420a includes statistical information 426a indicating a level of access of the table represented by the node. This level of access may in some embodiments be presented in the form of a percentage. For example, the percentage of users that accessed the table or the percentage of queries that accessed the table.

As further shown in detail 490*a*, each table node 420*a* may also include a listing of column identifiers 428*a* representative of columns present in the table. As with the table identifiers, column identifiers may include a name of a particular column (e.g. "c_firstname") indicating that the column stores string values of the first names of customers. Column identifiers 428*a* may also include a information regarding usage of the column. For example, in the visualization 400*a* shown in FIG. 4A, each column identifier 428*a* of each table node 420*a* includes an icon indicative of an operation (e.g. the most popular operation) associated with the column based on the workload data 212. For example key 440*a* may display a listing of the most popular operations represented in the workload data, here, "select," "filter," " group by," and "order by." Each column identifier 428*a* included in a table node 420*a* accordingly may include an icon that corresponds with those in key 440*a*, thereby providing a user with valuable insight into how data in a particular column is being used.

As suggested in FIG. 4A, in some embodiments, various graphical elements may be color coded to convey information to the user. For example, table nodes 420*a* may be color coded to convey the level of access or the top operations. In FIG. 4A, table nodes are displayed with a varying shade of blue with lighter shades shade representing a relatively low level of access and a darker shades representing relatively high levels of access. This is further indicated in a table node summary 460*a* shown in the left hand column that displays representations of the table nodes 420*a* in descending order of access level.

In any given implementation, the data stored at systems 208*a-b* will likely be organized into far more tables and columns than can be effectively displayed via visualization such 400*a*. Accordingly, in some embodiments, the process of displaying such as visualization may include selecting the tables and columns to represent.

For example, in a first step of such a process, system causing display of the visualization may first identify all the tables represented in the workload data and resolve how the tables are related or connected to one another. Once the all the tables are identified, the system may select a set number of those tables to display as table nodes 420*a*. The number of table nodes to display can be based on a predetermined number or based on certain constraints, for example, the limits of the display and/or user interface through which the visualization will be displayed. In either case, in some embodiments, the system selects the most popular tables by some measure of access level (e.g. access percentage, absolute number of queries, access by particular entities, data volume, etc.) For example, the table nodes 420*a* displayed via visualization 400*a* in FIG. 4A may represent the top 7 tables related to the most highly accessed table "store_sales." As will be explained later, in some embodiments, visualization 400*a* is interactive in that it can dynamically change in response to user inputs. For example, a user may filter according to a particular one or more operations. In such embodiment, the selected set of tables may stay the same regardless of user inputs, or may dynamically change in response to user inputs. For example, the top set of tables accessed for "order by" operations may be different than the top set of tables accessed for "group by" operations.

Once the set of tables is selected, a system may determine a color/shade to apply to the visual representation of the table (i.e. the table node). As suggested in FIG. 4A, the selected color may be based on a gradient of shades according to a level of access. For example, the shade may be darkest for relatively high levels of access (e.g. over 60%) and lighter for relatively low levels of access (e.g. below 40%).

Once the tables have been selected and the color/shade selected, the system may determine which column identifiers 428*a* to include for display with each table node 420*a*. In an embodiment, this process may involve selecting the top columns from each category of column operation. For example, the system may select a set number of the top columns associated with "select," "group by," "order by," and "filter" operations in the corresponding table. For each column selected, the system may cause display of the column identifier 428*a* including an icon associated with the most popular operation for that column. In some cases, a column may rank the same for two types of operations. In such cases, the system may display two icons or may select the operation determined to be more important. For example, the system may generally rank operations according to some predetermined scheme, for example: "group by">"filter">"order by">"select." Note that this ranking is just an example, provided for illustrative purposes. This example ranking makes sense from a usage analysis standpoint as "group by" operations will tend to be more computationally intensive than "select" operations. Depending on the requirements of a given implementation, operation rankings may be different. Further rankings may be different for different types of tables. In a color coded scheme, the system may then select a color/shade to apply to the column identifier 428*a*, in some embodiments the color selected may pertain to the operation associated with the column identifier 428*a*. For example, as indicated in key 440*a*, "select"=blue, "filter"=yellow, "group by"=red, and "order by"=green. Again, these are just example color codes and are not to be construed as limiting. Further, similar to the color/shade selection for table nodes 420*a*, selection the selected color for column identifiers 428*a* may include shade selections based on a range of levels of access. For example, For example, the shade may be darkest for relatively high levels of access (e.g. over 60%) and lighter for relatively low levels of access (e.g. below 40%).

As shown in FIG. 4A, in some embodiments column identifiers 428*a* representing columns in a particular table may be visually represented as a set of smaller rectangular graphical elements enclosed in the larger rectangular graphical element representing the table node 420*a*. Again, these are example shapes provided for illustrative purposes and are not to be construed as limiting. Column identifiers in other embodiments may be visually represented using alternative graphical elements. In some embodiments column identifiers 428*a* may be ordered in a particular table node 420*a* based on their relative levels of access. For example, the column identifiers 428*a* associated with the most highly accessed columns may be listed first.

In some embodiments interactive options are provided through which a user can interact with the displayed visualization 400*a*. In response to receiving input via such options, a system may dynamically update the interactive visualization based on the input. For example, the visualization 3400*a* depicted in FIG. 4 shows an example option 430*a* in the form of a pull down menu through which a user can filter according to certain categories of operations (e.g. "select," "filter," "group by," etc.). In receiving a user selection of a particular category of operation via the option 430*a*, the system may dynamically update display of the usage heatmap diagram to include the column identifiers 428*a* associated with the selected particular category of operation. This allows the user to gain further insight into how the underlying data is being used. Recall that in some embodiments, the displayed set of table nodes 420a may not change regardless of the user's selection via option 430a. Option 430a is only an example of various options that may be provided to users to interact with a visualization. Other embodiments may allow users to, for example, select particular data elements (e.g. tables, columns, etc.), select particular entities (e.g. users, devices, networks, applications, etc.) associated with the workload data, select particular time frames, geographical locations, etc. The manner in which the interactive options may be customized will be limited only by the information included in the workload data. Further the interactive mechanics may differ in other embodiments. Option 430a is shown in FIG. 4A as a pull down menu however this is just an example provided for illustrative purposes. In other embodiments this option may be provided via other mechanisms. For example, an option may include any of an editable text field, check boxes, radio buttons, date fields, sliders, or any other types of graphical user interface features. Further some of these features may be touch based. For example a user may filter according to a particular category of operation by instead touching a displayed column identifier 428a to bring up a pop up menu.

FIG. 4B shows another example visualization 400b in the form of a usage heatmap diagram. Visualization 400b of FIG. 4B is an alternative embodiment to the visualization 400a of FIG. 4A but is otherwise generally similar. As shown in FIG. 4B, in some embodiments to fit more information into the visualization, certain table nodes may be displayed as part of a table node stack 422b. For example, a table node stack 422b may include various nodes related to fact tables present in the underlying data. Each of the fact table may have inferred relationships with different sets of dimension tables. Presenting the fact tables as a stack will allow the user to easily flip through the different heatmap diagrams to view these different relationships. Also shown in FIG. 4B, users may interact with certain graphical elements to access additional information. For example, in response to detecting user interaction with a particular column identifier 428b, a system may cause display of additional information 432b regarding usage of the column represented by the particular column identifier 428b. For example, in FIG. 4B a user has interacted with (e.g. by placing a cursor over) particular column identifier 428b titled "dd_year" in a dimension table node titled "Date_dim." The particular column identifier 428b includes an icon associated with the most popular operation associated with the represented column, specifically the "lookup" operation as well as a numerical count (e.g. 72) of the number of query operations that accessed the represented column. In response to the user's interaction with the particular column identifier 428b, the system causes display of a pop up graphical element 432b that breaks down some or all of the 72 counted query operations by query type (e.g. "lookup"=58, "display"=7, "ranking"=3, etc.), in this way the user can gain insight into some of the less popular operations associated with particular columns.

Join Diagram

Tables can be joined together during the execution of certain queries. Such join operations may be critical to the execution of certain queries and can provide insight into the level of complexity of such queries. For example, queries that require the joining of large numbers of tables are generally understood to be complex in nature meaning that they may not be suitable for implementation in certain environments such as Hadoop™. Such insight is particularly useful to some users, for example database administrators, that are monitoring usage of the data and considering migration to an alternative environment. These complex join relationships can be difficult to convey, however using only text or statistical figures based on the workload data. Instead visualizations can be displayed that effectively convey these insights to users.

Figure 5:
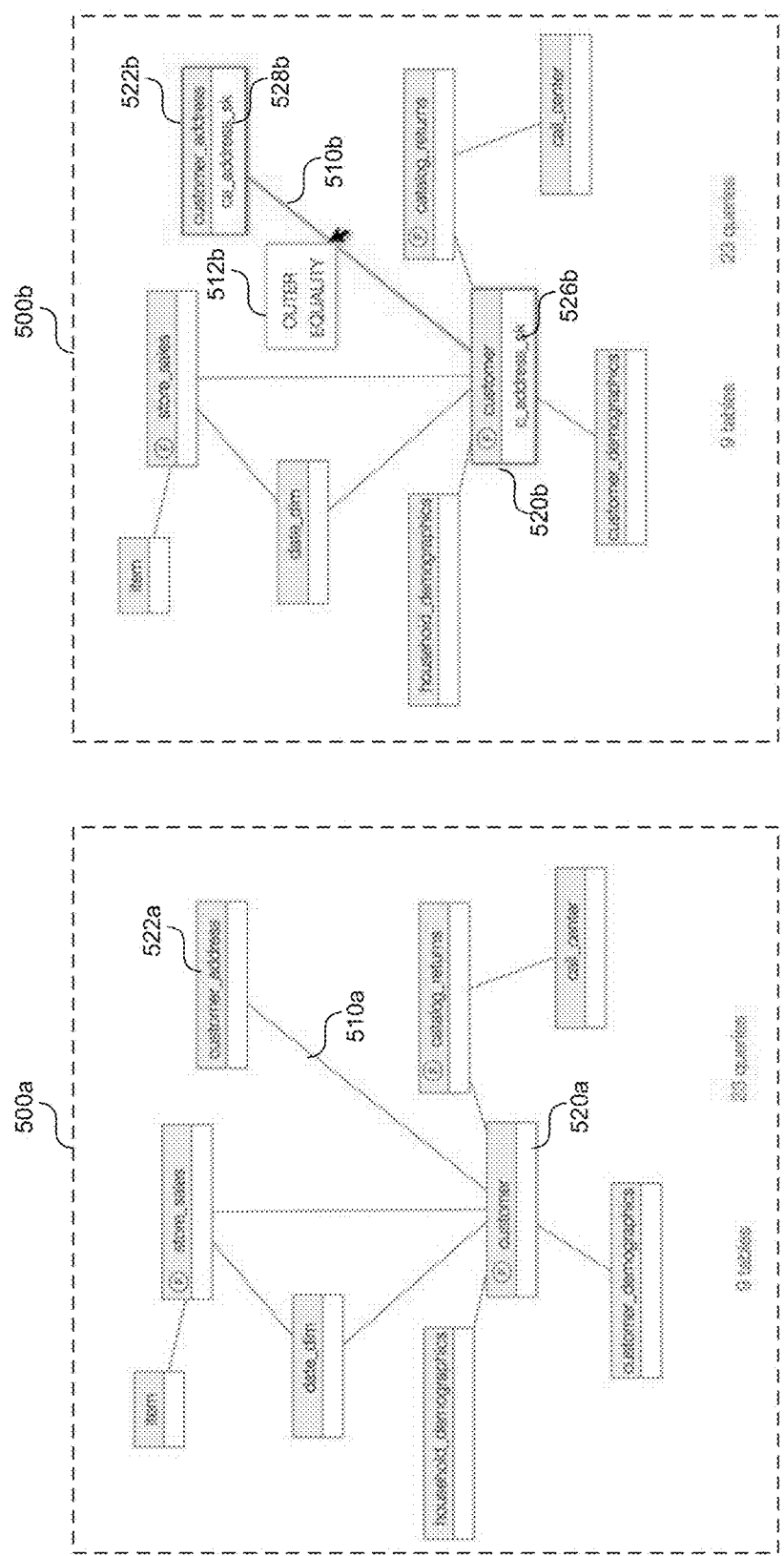
FIG. 5 shows screen captures of an example join diagram.

FIG. 5 shows a series to two screen captures 500a and 500b showing a sequence of an example visualization in the form of a join diagram, according to some embodiments. Similar to the usage heatmap diagrams described with respect to FIGS. 4A-4B, a join diagram can include a number of visually connected nodes that convey relationships between tables present in the data stored at systems 208a-b. Again these relationships may be inferred based on the received workload data 212. For example, a query execution log will may describe a set of queries executed at data storage systems 208a-b. Specifically, the log may describe a set of join operations performed as part of the execution of these queries. When enough join operations are observed patterns begin to emerge and relationships can be inferred.

Screen capture 500a shows an example join diagram at a first instance. As shown in FIG. 5, the example join diagram includes a plurality of table nodes representing tables present in the data stored at systems 208a-b. Here, the linking relationships are based on patterns of join activity in the observed queries. For example the join diagram in screen capture 500a shows a first table node 520a (representative of a fact table titled "customer") visually linked to a second table node 522a (representative of a dimension table titled "customer_address") via a graphical element 510a (e.g. a drawn line). The join relationship suggests that a number of queries included execution of operations joining values from the "customer" and "customer_address" tables.

The process of selecting which tables to display in a particular join diagram can be similar to the process of table selection in a usage heat diagram. In an embodiment, a system in accordance with the present teachings may identify join operations occurring at systems 208a-b by analyzing the resulting workload data 212. Based on these identified join operations, the system may infer join relationships between two or more identified tables. This inference may in some embodiments simply be based on a count or a relative level of query operations joining any two tables or columns/values from any two tables as observed in the workload data. In generating the join diagram for display, a system may select a set number of tables that are associated with the most such join relationships. Again, this selection can be based on a number of constraints such as the limits of the UI through which the visualization will be displayed.

To accommodate display of more join relationships in a given visualization, each table node may simply be displayed as a rectangle with some sort of identifier associated with the represented table, for example the name of the table. However, interactive mechanics can be introduced through which a user can progressively uncover additional information regarding the join relationships. Screen capture 500b shows the example visualization of screen capture 500a but at a second instance based on a user interaction. In screen capture 500b, a user has interacted with the graphical element (i.e. the drawn line) visually linking two of the table nodes. For example, the user may have placed mouse cursor over the line or touched the line if using a touch screen display. In response the visualization is dynamically updated to reflect this selection. For example, table nodes 520b, 522b and linking line 510b now include a visual indication of the selection in the form of a highlighted border (e.g. in a particular color).

In some embodiments information can be displayed regarding the type of join operation associated with a particular join relationship. For example, as shown in screen 500b, a graphical element 512b is displayed adjacent to link 510b showing that one or more of the join operations underlying the inferred join relationship between nodes 420b and 522b are "outer" or "equality" joins.

Further, each table node 520b, 522b associated with the selected join relationship may update to display a column identifier representing a column in the represented tables upon which some or all of the join operations were executed or that served, for example as a join key. For example, screen capture 500a shows that a first table node 520a (representative of a fact table titled "customer") has a join relationship with a second table node 522a (representative of a dimension table titled "customer_address") as indicated by the link 510a. In response to a user selection of the join relationship (e.g. by placing a cursor over link 510a), the visualization is updated as shown in screen 500b such that table nodes 520b, 522b now include column identifiers 526b, 528b (respectively) indicating one or more join keys associated with the join operations upon which the inferred join relationship is based. The user can further click on a particular table node to receive additional information regarding the represented table.

Column Family Diagram

Some queries aggregate values from multiple columns in multiple tables by executing for example "group by" operations. As with join operations, group by operations involving large numbers of columns and/or tables can provide insight into the level of complexity of certain queries. Queries that require the aggregation of values many different columns and tables are generally understood to be complex in nature meaning that they may not be suitable for implementation in certain environments such as Hadoop™. Such insight is particularly useful to some users, for example database administrators, that are monitoring usage of the data and considering migration to an alternative environment. The complexity of such queries can be difficult to convey using only text or statistical figures based on the workload data. Instead visualizations can be displayed that effectively convey these insights to users.

Figure 6:
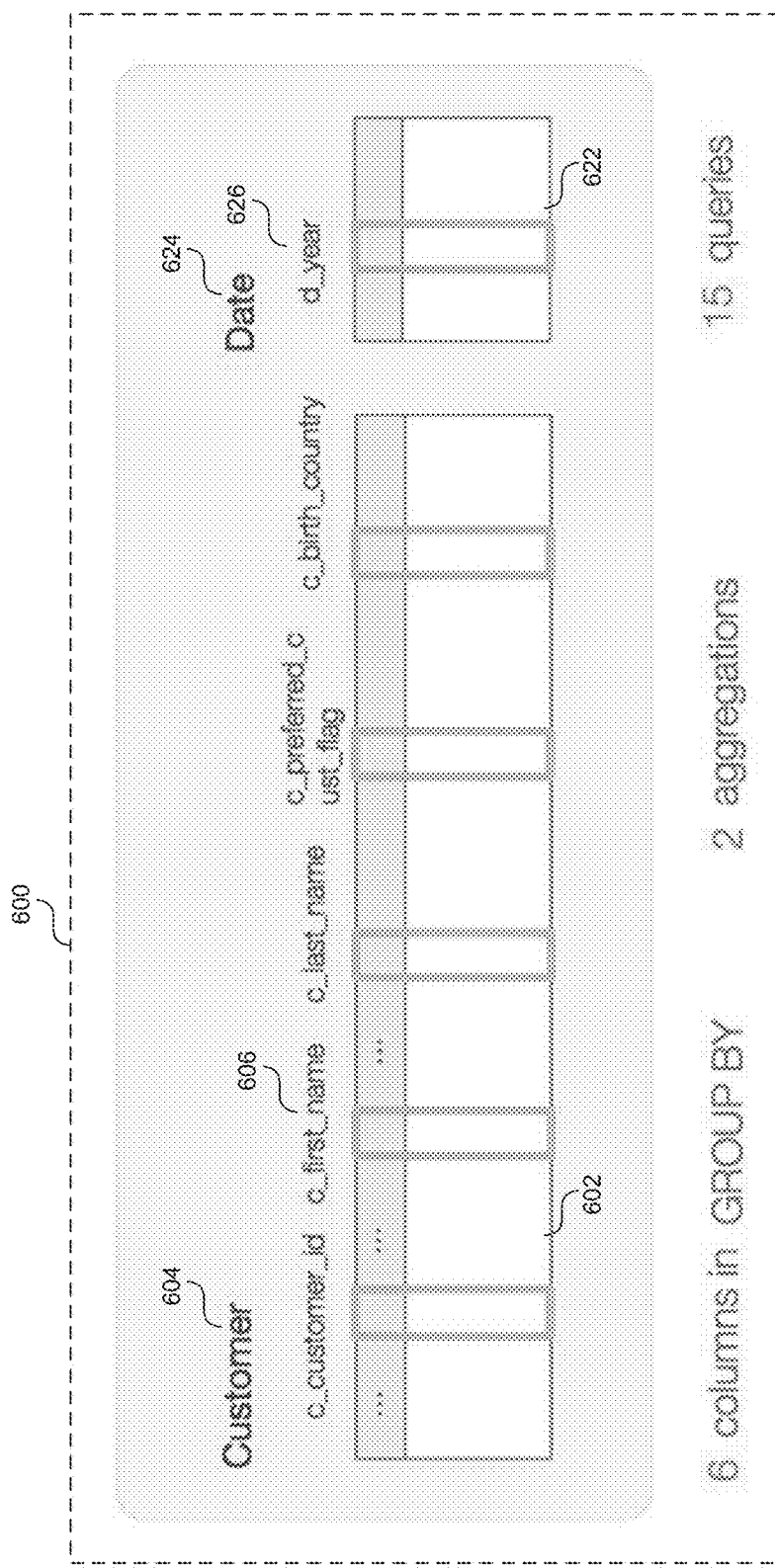
FIG. 6 shows a screen capture of an example column family diagram.

FIG. 6 shows a screen capture 600 of an example visualization in the form a column family diagram. In some embodiments a column family diagram can visually represent one or more tables related to a particular "group by" operation or a pattern of "group by" operations. For example, the visualization in FIG. 6 shows a first table titled "Customer" associated with a second table titled "Date." Each table may be visually represented by a graphical elements 602, 622 (e.g. a rectangle) and may include an associated table identifier 604, 624 (e.g. a table name). Further, each graphical elements 602, 622 may include graphical elements 606, 626 representing columns associated with each table upon which the "group by" operations are performed. As indicated by the information at the bottom of visualization 600, the column family diagram shown in FIG. 6 is based on workload data from 15 queries and is representative of two aggregations involving 6 columns associated with the "Customer" and "Date" tables.

Filter Diagram

Filter operations included in queries can reflect how subsets of certain datasets are being accessed by users. Popular filters can suggest that new partitioning strategies can be implemented to reduce the costs of accessing data. For example, partitioning can be applied to subdivide tables according to popular filters so that data can be accessed quicker.

Figure 7:
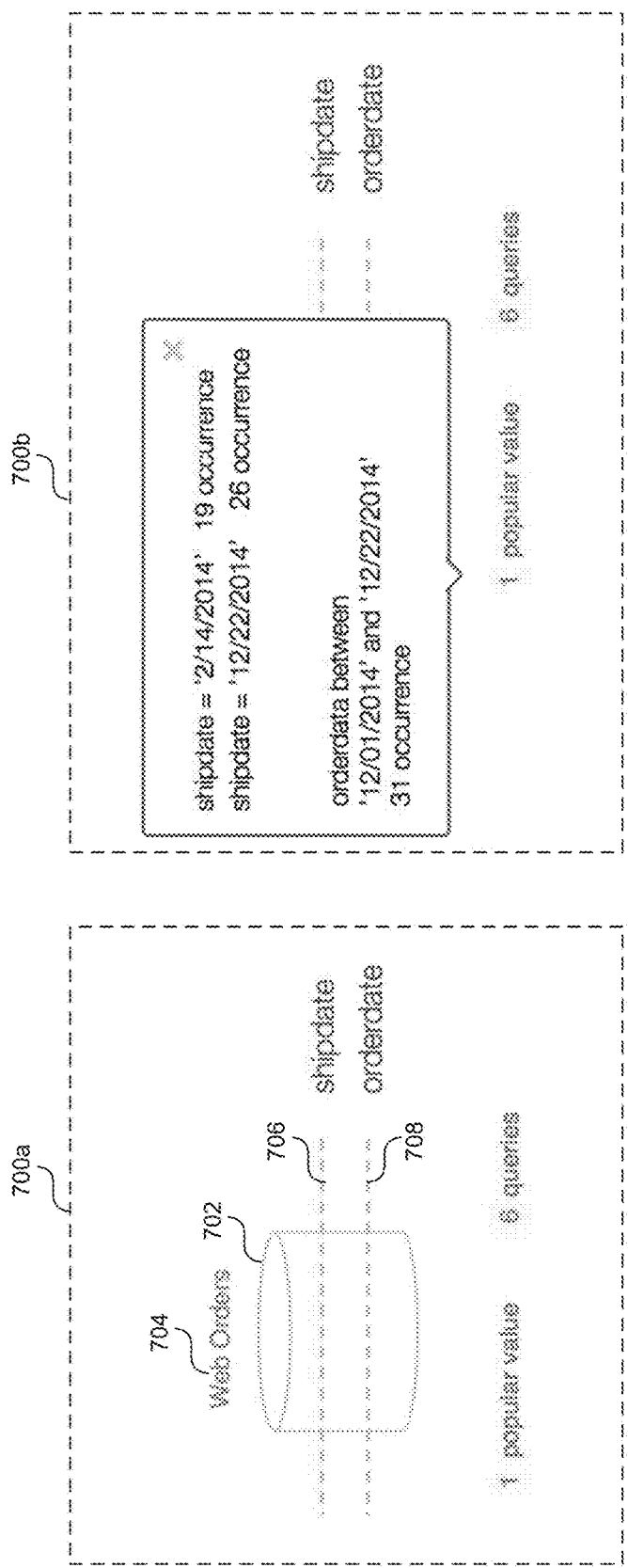
FIG. 7 shows screen captures of an example filter diagram.

FIG. 7 shows a series of screen captures 700a and 700b of an example visualization in the form a filter diagram. As shown in screen capture 700a, a filter diagram can include a visual representation of a data structure associated with the data stored at system 208a-b. For example, a isometric views of a cylinders are commonly used in the art to generally represent an element associated with the storage of data. A graphical object 702 of such a cylinder is depicted in screen capture 700a. In this context, the graphical object 702 can represent any sort of structure, substructure, or element associated with the storage of data at systems 208a-b. For example, in some embodiments graphical object 702 can represent a database or a specific table within a database. In some embodiments a filter diagram may further include an identification associated with the data element represented by graphical object 702. For example, as shown in FIG. 7, graphical object 702 includes and associated identifier 704 that includes a name of a table represented by object 702. The example graphical object 702 in the shape of a cylinder is provided for illustrative purposes, but is not to be construed as limiting. Other shapes may be used in other embodiments.

In any case, a filter diagram may further include one or more visual indications of popular filters applied to the element represented by graphical object 702. Again, information on popular filters applied to certain elements may be gathered through analysis of the workload data 212. In an embodiment popular filters are represented by one or more lines 706, 708 bisecting the graphical object 702. For example, as shown in screen capture 700a, based on an analysis of the workload data 212, a visualization is displayed that indicates that queries accessing the "Web Orders" table tend to include operations that filter based on values included in the "shipdate" and the "orderdate" columns. As previously mentioned this may indicate to a user managing the data (e.g. a database administrator) that the "Web Orders" table may be partitioned based on one or more of these identified columns. As with graphical object 702, the example lines 706 and 708 shown of illustrative purposes, but are not to be construed as limiting. In other embodiments, popular filter keys may be indicated with alternative visual arrangements.

In some embodiments, in addition to displaying identifiers of popular columns upon which filter operations are based a filter diagram may be configured to display popular values associated with those filters. For example, screen capture 700b shows an updated filter diagram displayed in response to a user interaction. As shown in screen capture 700b, in response to a user interaction (e.g. placing the cursor over the diagram or selecting the "popular value" option), information regarding popular values associated with the one or more popular filters may be displayed. In screen capture 700b, information is displayed indicating particular values (i.e. dates in this case) used to upon which filter operations were based, according to the workload data 212.

View Lineage Diagram

In some contexts, a "view" can generally be understood as a temporarily stored dataset that is based at least in part on one or more tables. Views can provide easy access to data associated with the tables because the hide the complexity of the underlying table relationships. However, while queries executing on views may appear simple, they can often be computationally more complex because they execute on data stored in the underlying tables. In some embodiments the workload data based on such queries can be analyzed to display visualizations that effectively the lineage (in other words table dependencies) of certain views.

Figure 8:
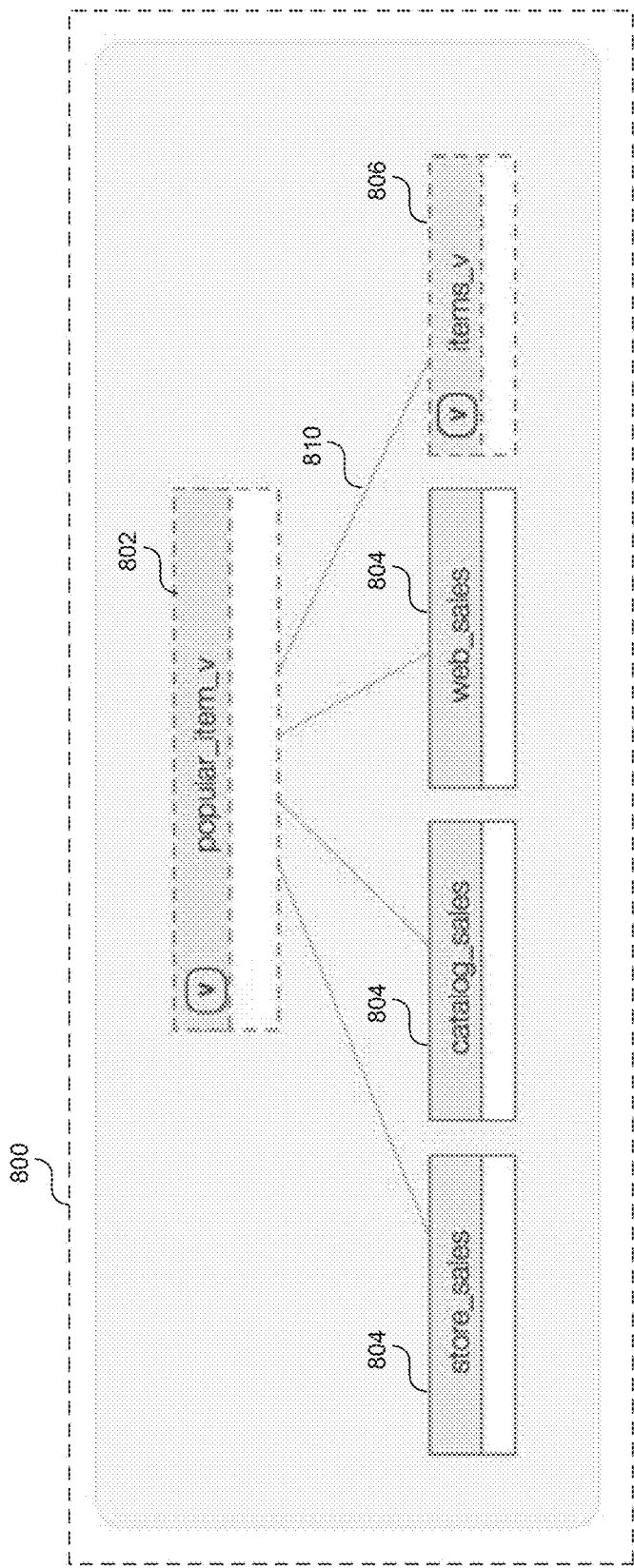
FIG. 8 shows a screen capture of an example view lineage diagram.

FIG. 8 shows a screen capture 800 of an example visualization in the form of view lineage diagram. As shown in FIG. 8, a view lineage diagram can include a view node 802 representative of a view upon which one or more queries were executed at a data storage system 208*a-b*. As mentioned, the view represented by view node 802 may depend on one or more tables and/or other views associated with the data stored at system 208*a-b*. Accordingly, the view lineage diagram also includes one or more table nodes 804 and/or other view nodes 806 that represent of tables or other views upon which the view (represented by node 802) depends. Each of the nodes 804 and 806 can be visually linked to the view node 802 by some graphical object, for example a line 810 as shown in FIG. 8. As with the previously described table relationships, these view dependencies can be based on explicit indications in the workload data 212 and/or inferred based on information included in the workload data 212.

As shown in FIG. 8, each of the nodes 802, 804, and 806 can, in some embodiments, be visually presented as a rectangular box including an identifier associated with the view/table associated with a particular node. For example, the diagram in FIG. 8 shows that queries are being executed on a view titled "popular_item_v" and that this view depends on three tables ("store_sales," "catalog_sales," and "web_sales") as well as another view titled "items_v." In some embodiments, view nodes may appear similar to table. In some embodiments, a nodes status as a view node as opposed to a table node may be visually indicated, for example by a dashed outline, a "v" icon, (as shown in FIG. 8), or by any other visual indicator.

Data Flow Diagram

In some data processing pipelines, query scripts (e.g. in SQL) transform source data info intermediate data elements that can then be access for further processing. This type of workload (e.g. ETL/ELT) can in some cases represent a significant percentage of the overall processing workload. As a data storage system evolves and/or multiple database administrators come and go, the logic behind such processing pipelines can become obscured. In some situations, one can try to manually reverse engineer these processing pipelines to uncover the obscured logic, however doing so is often expensive and time consuming. Instead, based on an analysis of the workload data 212 a data flow diagram can be generated and displayed that effectively provides insight into the dependencies between certain queries.

Figure 9:
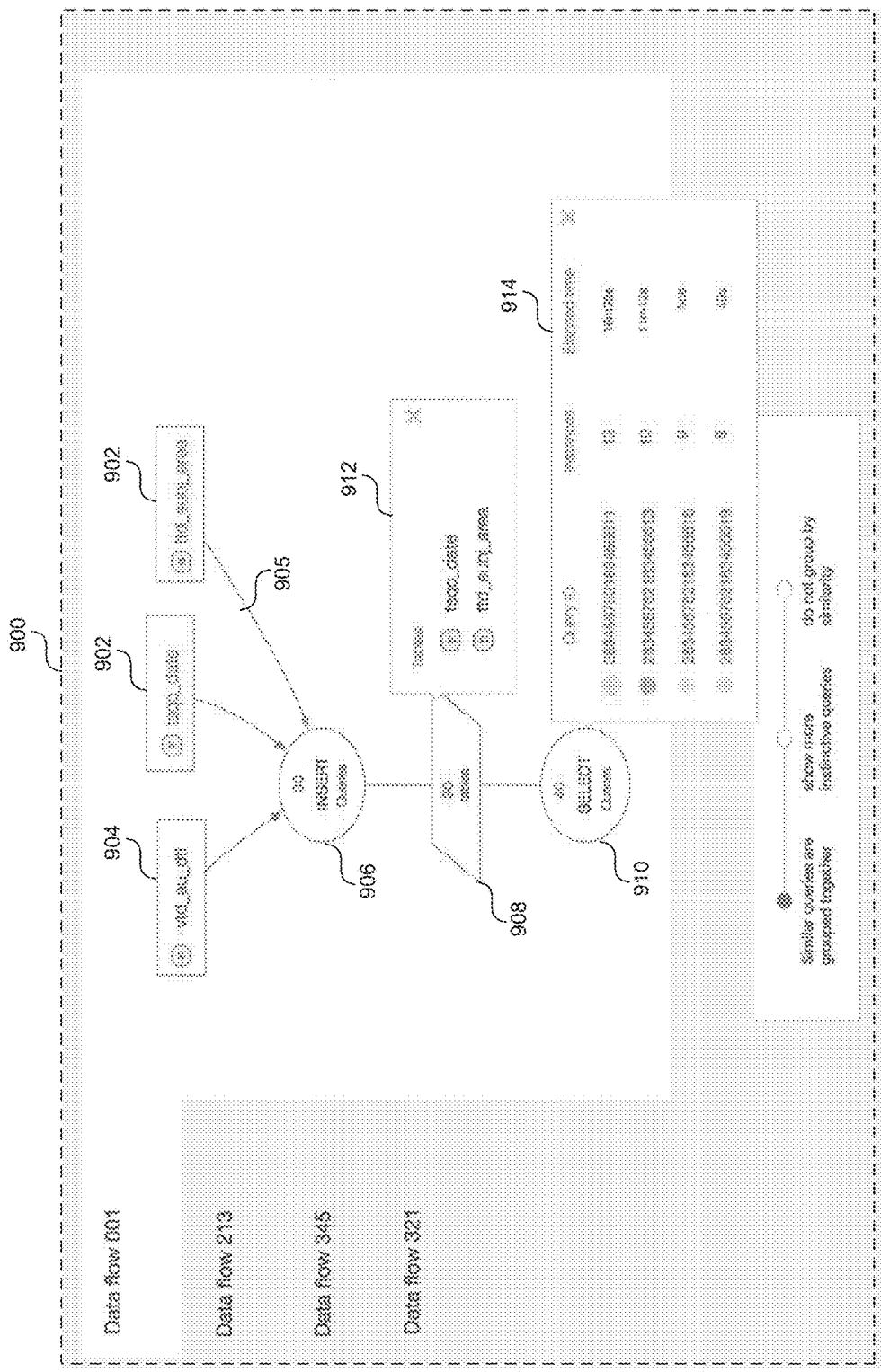
FIG. 9 shows a screen capture of an example data flow diagram.

FIG. 9 shows a screen capture 900 of an example visualization in the form of data flow diagram for a particular processing pipeline. The particular processing pipeline represented in the data flow diagram of FIG. 9 includes 30 queries joining 3 tables and inserting the values into 30 transient table from which 40 queries access data. As shown in FIG. 9, a data flow diagram can include one or more table nodes 902 representative of a tables as well as one or more view nodes 904 representative of a views upon which one or more queries were executed. The data flow diagram can further include one or more query nodes 906 representative of one or more queries executed on the tables and/or views represented by nodes 902 and/or 904. The data flow diagram can further include one or more transient table nodes 908 representative of one or more transient tables generated during execution of one or more queries represented by node 906. The data flow diagram can further include one or more query nodes 910 representative of one or more queries executed on the one or more transient tables represented by node 908. As with previous visualizations, these relationships and the logical schema may be inferred based on analysis of information included in the workload data 212.

Each of nodes 902, 904, 906, 908, and 910 may be visually linked together by one or more graphical elements such as lines 905 to convey the inferred relationships. For example, as shown in FIG. 9, table/view nodes 902, 904 are visually linked to query node 906 via lines 905. Query node 906 includes an identifier that states for example, a set of similar queries executed on the tables/views indicated by nodes 902, 904. For example, query node 906 represents 30 queries that include insert operations based on the tables/views indicated by nodes 902, 904. Transient table node 908 is visually linked to query node 906 and indicates that 30 transient tables resulted from the operations of the 30 queries represented by query node 906. Further, query node 910 is visually linked to transient table node 908 and indicates that 40 similar queries including "select" operations were run on one or more of the 30 transient tables represented by transient table node 910. Note that the arrangement of nodes in the diagram of FIG. 9 is provided to illustrate the visualization of an example data flow through an example processing pipeline. Visualizations of other data flows or according to other embodiments may include fewer or more nodes and in different visual arrangements than as shown in FIG. 9. Further the graphical object displayed for each node (e.g. an oval for query nodes 906, 910, a rectangle for table/view nodes 902, 904, and a parallelogram for transient table node 908) in the diagram of FIG. 9 are examples provided for illustrative purposes. Other types of graphical objects may be displayed at each node in other embodiments.

In some embodiments, users may access additional information associated with one or more of the nodes by interacting with the data flow diagram. For example, in response to a user interaction (e.g. by mouse cursor, touch gesture, etc.) with transient table node 908, a graphical object 912 may be displayed including information regarding one or more transient tables represented by transient table node 908. As another example, in response to a user interaction with a query node 906 or 910, a graphical object 914 may be displayed including information regarding the one or more queries associated with the node. For example, graphical object 914 includes a listing of queries associated with query node 910 including unique query identifiers, instances of each query, and elapsed time to execute the query.

Denormalization Diagram

In certain cases multiple tables can be joined or "flattened" into set of a fewer number of tables through a process generally referred to as "denormalization." Denormalization can be applied in certain operating environments, for example Hadoop™, to reduce the number of joins required to process certain queries. Described below is an example denormalization diagram that visually conveys recommendations to optimize schema to suite a particular operating environment (e.g. based on a particular data storage framework).

Figure 10:
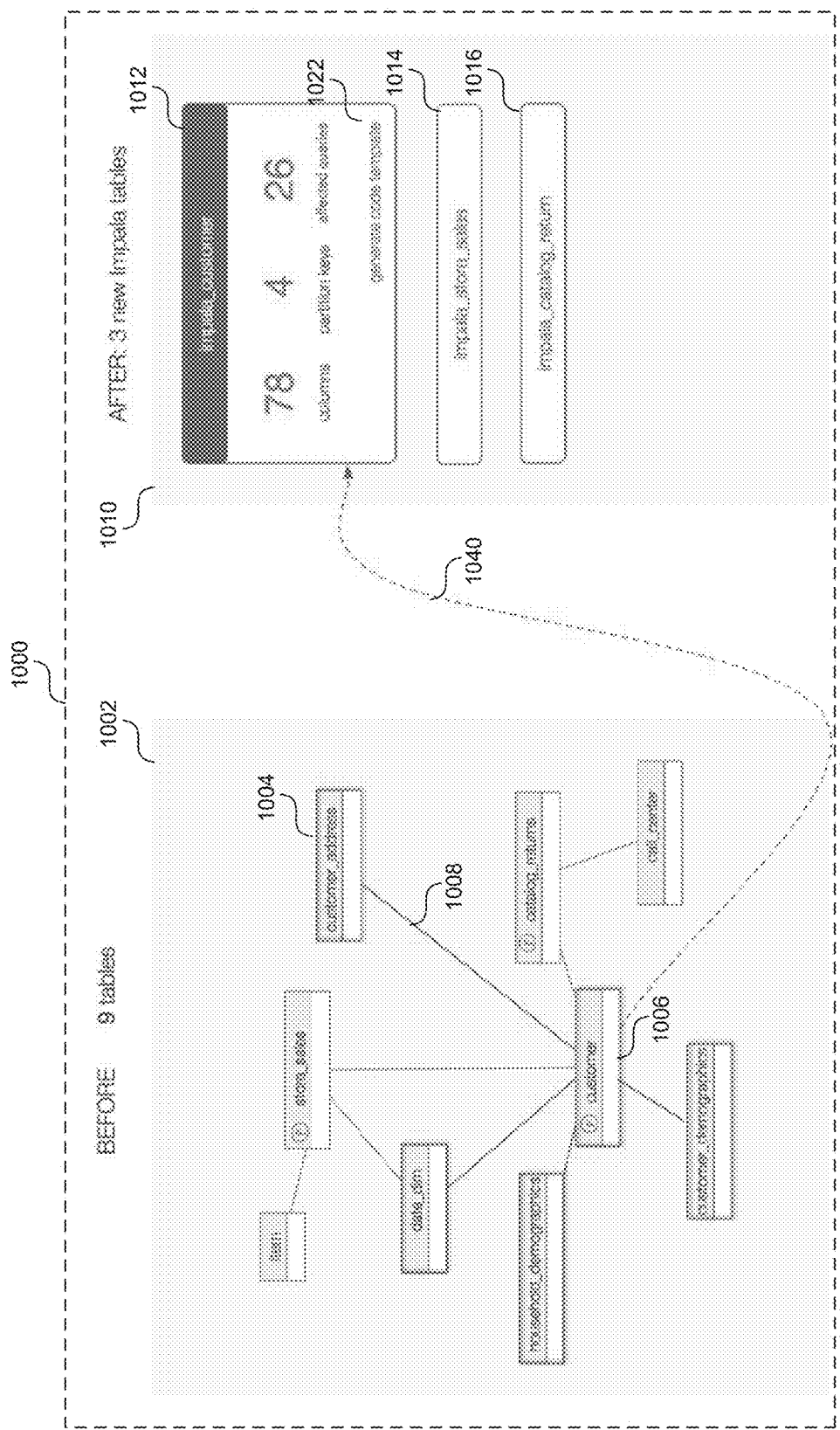
FIG. 10 shows a screen capture of an example denormalization diagram.

FIG. 10 shows a screen capture 1000 of an example visualization in the form of a denormalization diagram. As shown in FIG. 10, a denormalization diagram can include a visual representation of a current schema 1002 with one or more recommendations for denormalizing tables included in the current scheme to fit a particular operating environment. In an embodiment the visual representation of the current schema 1002 may include a plurality of table nodes (e.g. nodes 1004 and 1006) representative of a plurality of tables associated with data stored at system 208*a-b*. Each of the plurality of plurality of table nodes is visually linked to one or more of the other plurality of table nodes by a graphical object such as a line 1008. In some embodiments, the visual representation of the current schema 1002 is similar to the join diagram described with respect to FIG. 5. In other words the lines 1008 connecting table nodes 1004, 1006 may represent join relationships inferred based on the workload data 212. For example, the join diagram 1002 depicted in FIG. 10 shows join relationships among 9 discrete tables. This indicates a pattern of join operations in the queries observed in the workload data, some of which may suggest an opportunity to optimize through denormalization.

The denormalization diagram of FIG. 10 further includes a recommendation 1010 for denormalization of at least some of the tables depicted in diagram 1002 into a format configured for a particular operating environment (e.g. based on a particular data storage framework such as Hadoop™ or related tools such as Impala™ or Hive™). For example, as shown in FIG. 10, a set 5 of the 9 table nodes of diagram 1002 are highlighted in purple and visually inked (e.g. by arrow 1040) to a graphical object 1012 including a denormalization recommendation. Specifically, the denormalization diagram shown in FIG. 10 suggests that 5 of the 9 tables represented by diagram 1002 can be "flattened" into a single table configured for Impala™. Overall the set of 9 tables represented in diagram 1002 can be flatted into 3 total tables configured for Impala™ as indicated by graphical objects 1012, 1014, and 1016. The visualization shown in FIG. 10 clearly conveys to a user (e.g. a database architect or administrator) an optimization solution that involves migration of certain tables to an Impala™ based environment. Note, Impala™ is depicted in FIG. 10 as the target environment, however other targets (e.g. Hive™) may be displayed in other embodiments. In some embodiments, the target environment may be user selectable via and interface associated with screen 1000. In some embodiments an optimal target environment is automatically selected based on the current schema.

As shown in FIG. 10, in some embodiments a graphical object 1012 representative of a proposed new table for the target environment may include information regarding the proposed new table. For example, as shown in FIG. 10, object 1012 represents a proposed new table configured for Impala™ titled "impala_customer" which is based on the "customer," "customer_address," "date_dim," "household_demographics," and "customer_demographics" tables represented in diagram 1002. As shown in object 1012, the propose new table would include 78 columns with 4 partition keys and would impact (i.e. optimize) 26 of the queries indicated in the workload data 212. In some embodiments graphical objects 1012, 1014, and 1016 may be expandable and collapsible in response to user interaction. For example, object 1012 is depicted in an expanded state, while objects 1014 and 1016 are depicted in a collapsed state.

In some embodiments graphical objects representative of proposed table for the target environment (e.g. graphical object 1012) may include an option 1022 to generate a code or a code template (e.g. in a data definition language) to transform the current set of tables into one or more denormalized tables in a target format (e.g. Impala™). For example, in response to user interaction with option 1022, a code template may be generated and displayed to a user via screen 1000. The user may be provided the option to edit the code included in the template. The resulting edited code can then be executed (via the same interface or another application) to transform the current set of tables into the target format.

Workload Distribution Diagram

As previously discussed the amount of queries cataloged in any set of workload data 212 may in some cased be very high (i.e. on the order of millions of queries). Visualizations can be used to break this information down into logical groupings, for example, by specific users, applications, reports, etc. to provide insight into how certain entities are impacting the overall workload as indicated in the workload data 212. In certain embodiments, visualizations in the form of workload distribution diagrams can reveal the risk associated with optimizing and/or off-loading workload for different groupings. For example, risk level can be evaluated based on complexity of certain queries. In other words queries associated with certain logical groupings (e.g. particular users) can be individually evaluated for risk associated with architecture changes (e.g. optimization and/or off-loading to an alternative environment). Other than risk assessment, the breakdowns provided in a workload distribution diagram can give a user (e.g. a database architect) a clear view of how data is being used in an organization, thereby providing important insight that can be used to guide planning.

Figure 11A:
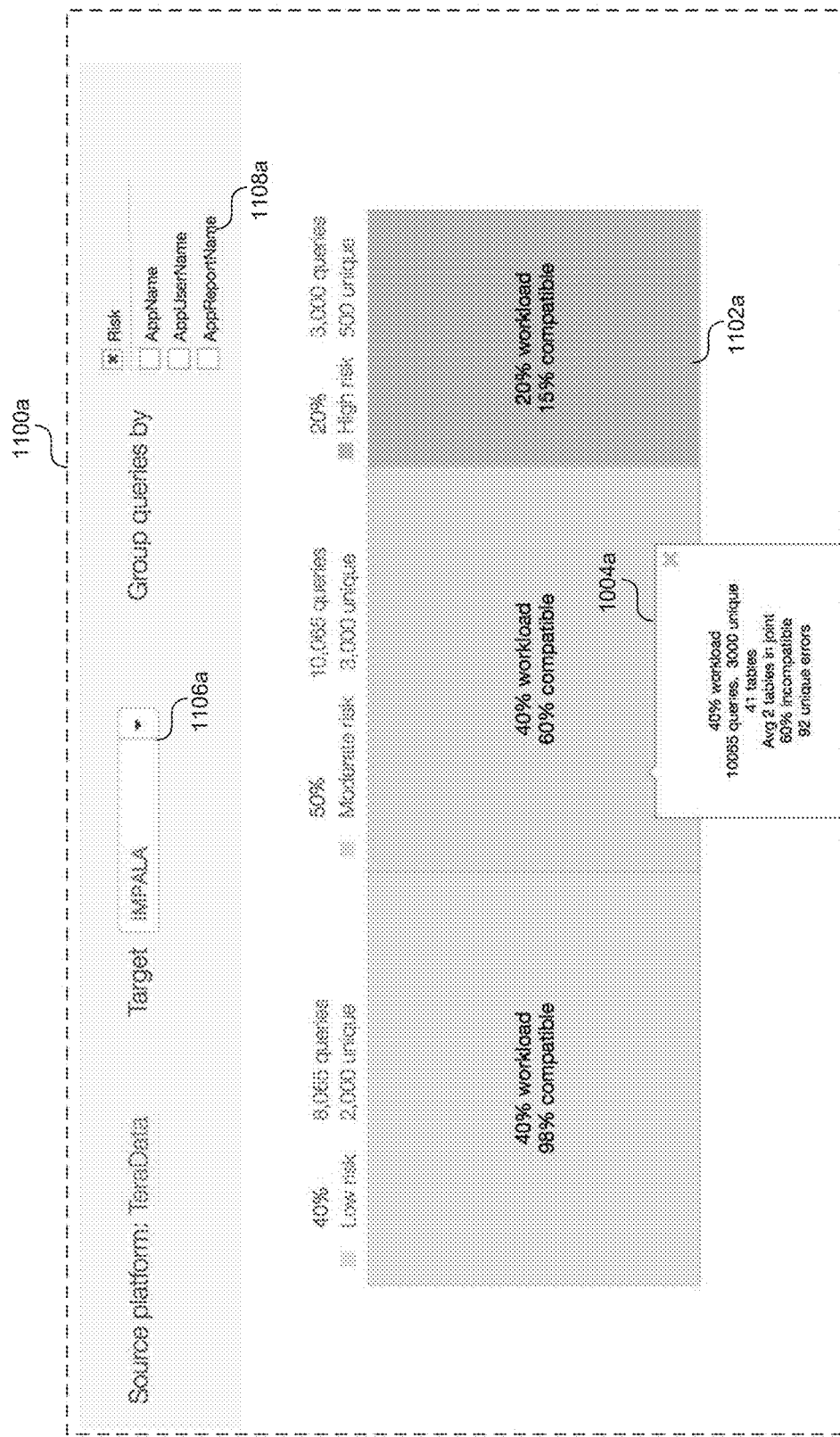
FIGS. 11A-11D show screen captures of example workload distribution diagrams.
Figure 11B:
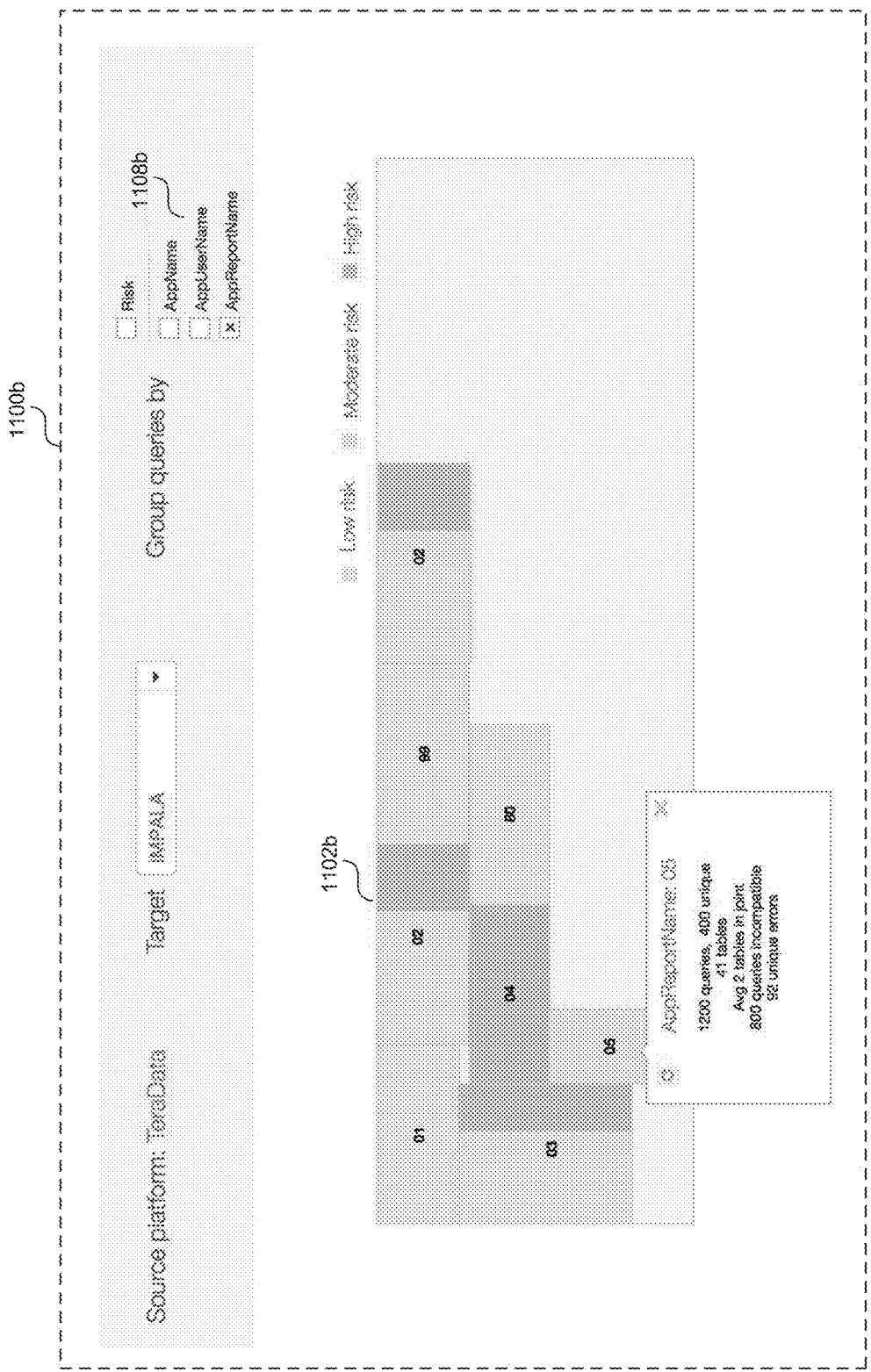

FIGS. 11A-11B show a series of example visualizations in the form of workload distribution diagrams, according to some embodiments. FIG. 11A shows a screen capture 1100*a* of an example workload distribution diagram, according to some embodiments. As shown in FIG. 11A, a workload distribution diagram can include a bar chart 1102*a* that divides queries represented in the workload data 212 into a set of risk categories for offloading from a source platform to a target platform. In other words, queries cataloged in the workload data 212 can be analyzed and categorized, for example based on complexity, into one of several risk categories (e.g. low, moderate, and high). Queries categorized as low risk generally have low complexity so there is little risk in offloading to a target environment (e.g. based on Impala™). As shown in FIG. 11A the bar chart 1102*a* may include associated information regarding each logical grouping such as a count of the number of queries, a count of the unique queries, a percentage of the overall workload, a count of the tables impacted, an assessment of compatibility with the target environment, and detected or potential errors. In additional information may be displayed (e.g. via a graphical object 1004*a*) in response to user interaction (e.g. using a mouse cursor or touch gesture) with bar chart 1102*a*.

Options to modify a workload distribution diagram may be provided to a user. For example, as shown in FIG. 11A, an option 1106*a* may be displayed through which a user may select a specific target environment (e.g. based on Hadoop™, Impala™, etc.) upon which to base the risk assessments for each category. As shown in FIG. 11A, option 1106*a* may be displayed in the form of a drop down menu through which a user may select from a predetermined list of target environments. As also shown in FIG. 11A, an option 1108*a* to modify groupings of the chart 1102*a* may be displayed. For example, option 1108*a* may be presented in the form of a check box or radio button through which a user can select various grouping schemes for the workload distribution diagram. In FIG. 11A, option 1108*a* is set to group queries according to risk for migration to the target environment (in this case one based on Impala™).

Figure 11C:
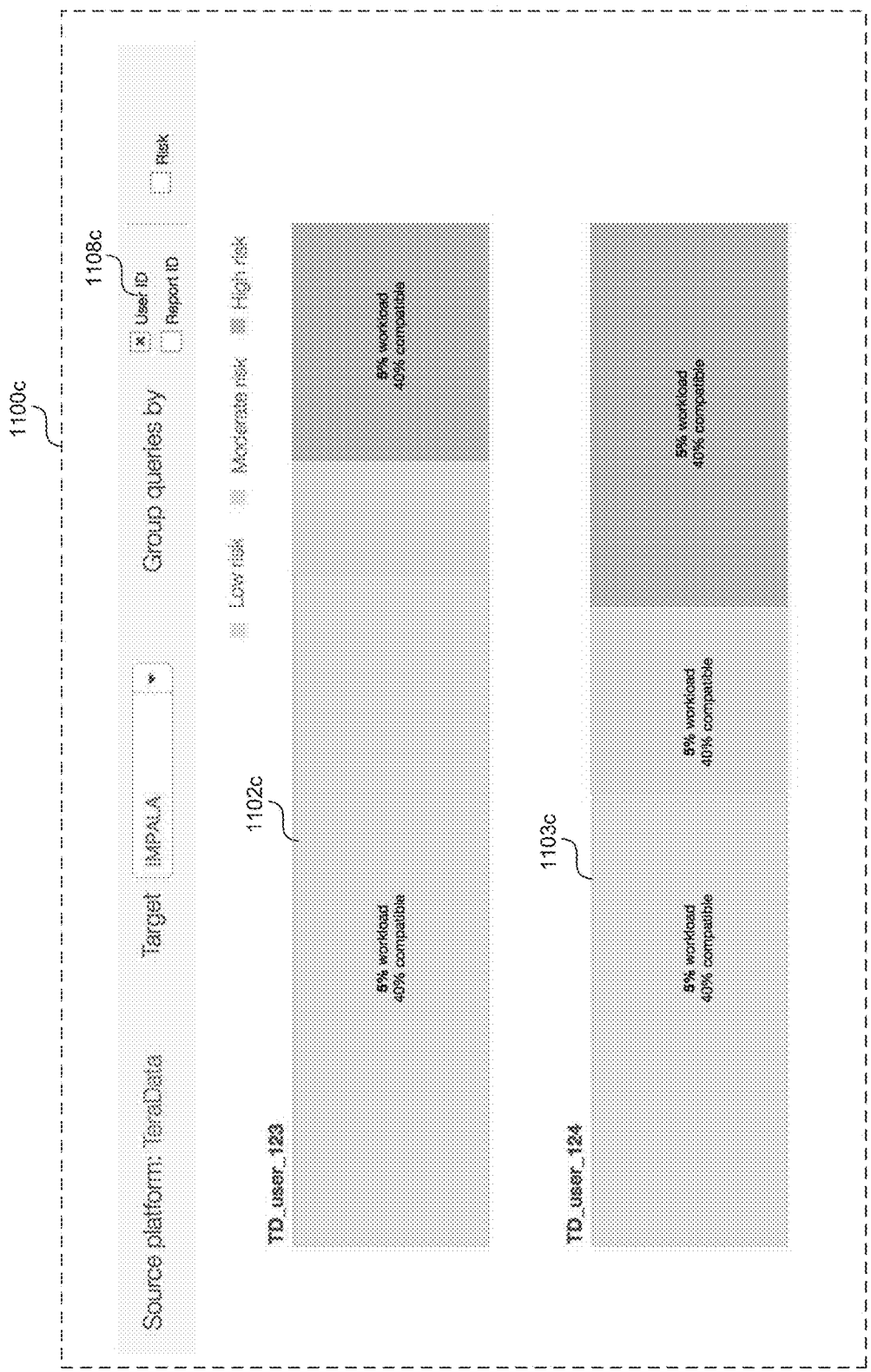

Alternatively, FIG. 11B shows a second screen capture 1100*b* of an example workload distribution diagram with a chart 1102b showing queries grouped by an application report name as indicated by the user selection via option 1108b. In some embodiments the workload distribution diagram of screen 1100b may be displayed to the user in response to a selection of "AppReportName" via option 1108a (as shown in 1108b). Similarly, FIG. 11C shows a third screen capture 1100c of an example workload distribution diagram with a charts 1102c and 1103c showing queries grouped by particular user identifiers (e.g. as shown at option 1108c). The workload distribution diagram shown in FIG. 11C would provide insight into how different end users are accessing data at systems 208a-b and provide a risk assessment for migrating their associated workload to a particular target environment (e.g. one based on Impala™). For example, based on a quick glance at charts 1102c and 1103c, it is clearly evident that workload associated with "TD_user_123" is more suitable to migration to an Impala™ based system that the workload associated with "TD_user_124".

Figure 11D:
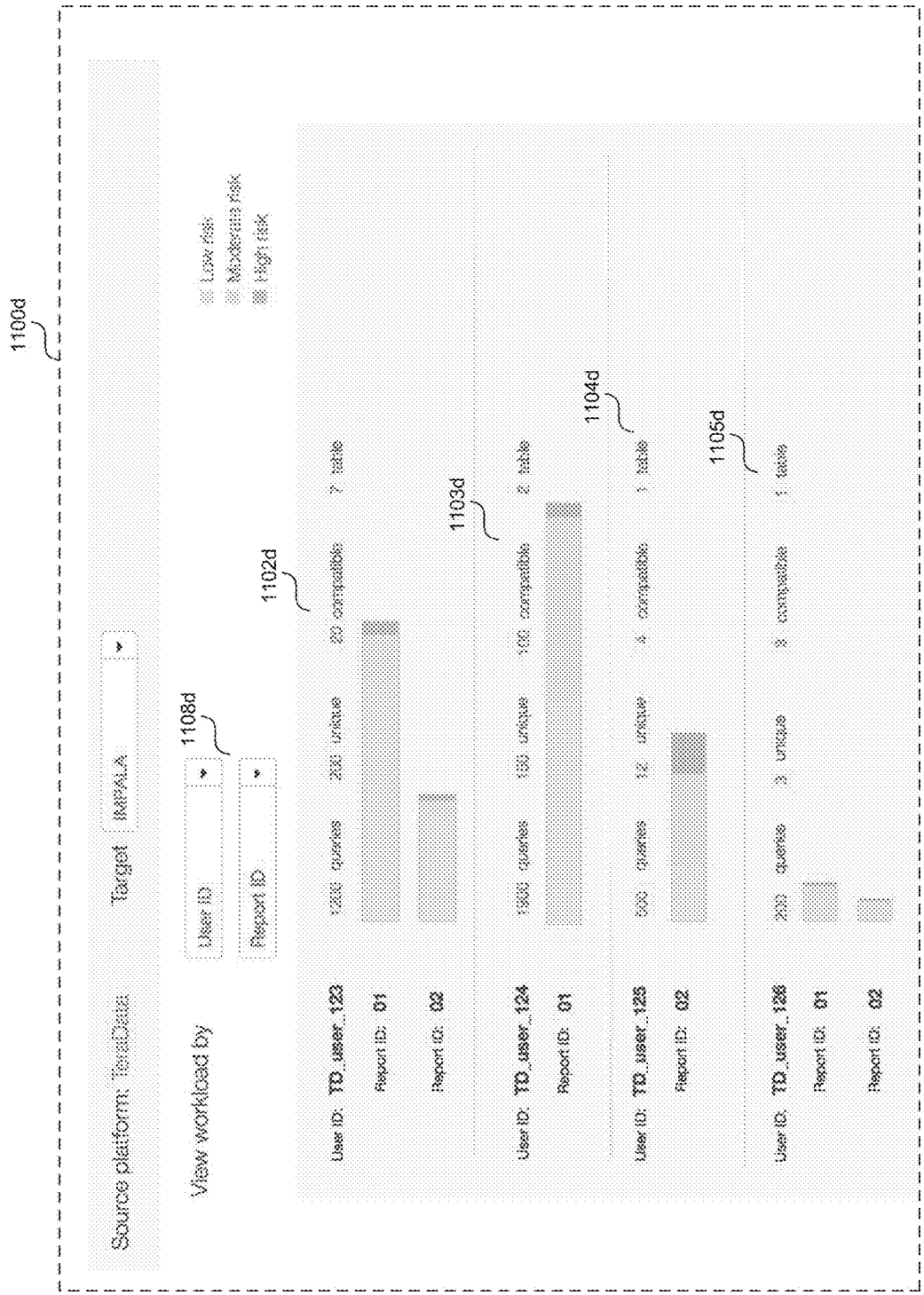

In some embodiments options may be provided to split workload distribution diagrams according to multiple categories. FIG. 11D shows a fourth screen capture 1100d of an example workload distribution diagram with multiple charts split according to both particular user identifiers and report identifiers. As indicated at option 1108d, a user has elected to display the workload split by "User ID" and "Report ID." The result is a series of charts 1102d, 1103d, 1104d, and 1105d that display queries associated with each of several unique user identifiers further split by a unique report identifier. For example, as shown in FIG. 11D, "TD_user_125" is only associated with workload related to Report ID 02 while "TD_user_123" is associated with workload for both Report ID 01 and 02. In this example, "TD_user_123" is associated with a higher volume of queries, but relative to "TD_user_125," those queries are more suited to migration to an Impala™ based system. Note, that the categorical splits shown in FIG. 11D are examples provided for illustrative purposes are not to be construed as limiting. In other examples options may be provided to split according to other categories such as enterprise department, time of day, geographical location, etc. In some embodiments selectable categories will depend on the information included or inferred from the workload data 212.

Accordion Interface Element

The aforementioned example visualizations represent effective tools for performing workload analysis. In general workload analysis can be divided into multiple categories. For example, insights can be gathered based on tables, queries, columns, etc. In some cases, the insights gathered for each category may not necessarily relate to one another. To effectively convey multiple insights in an intuitive manner, interactive interface features may be implemented, such as an "accordion" interface element.

Figure 12A:
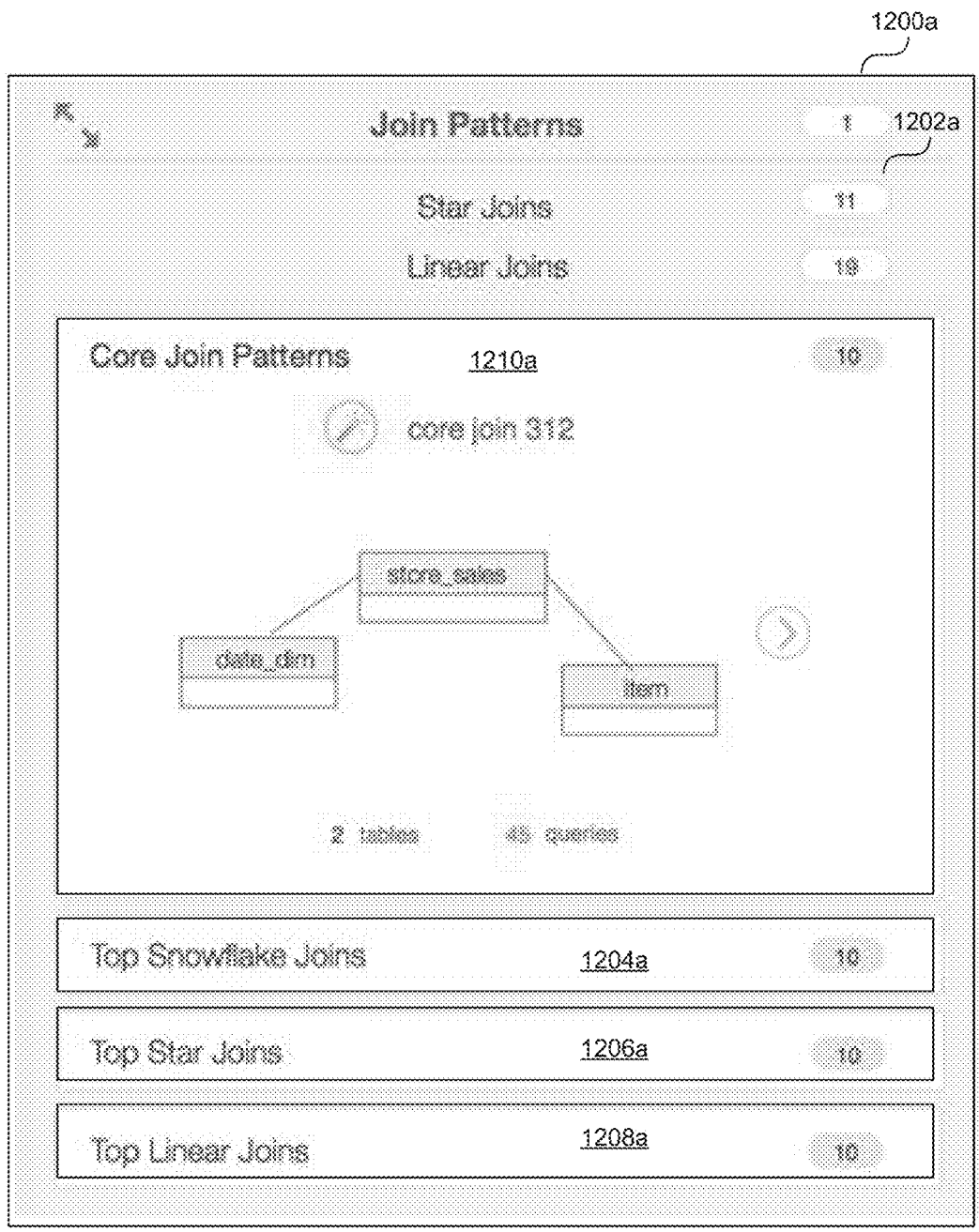
FIG. 12A-12C show example accordion box interface elements.
Figure 12B:
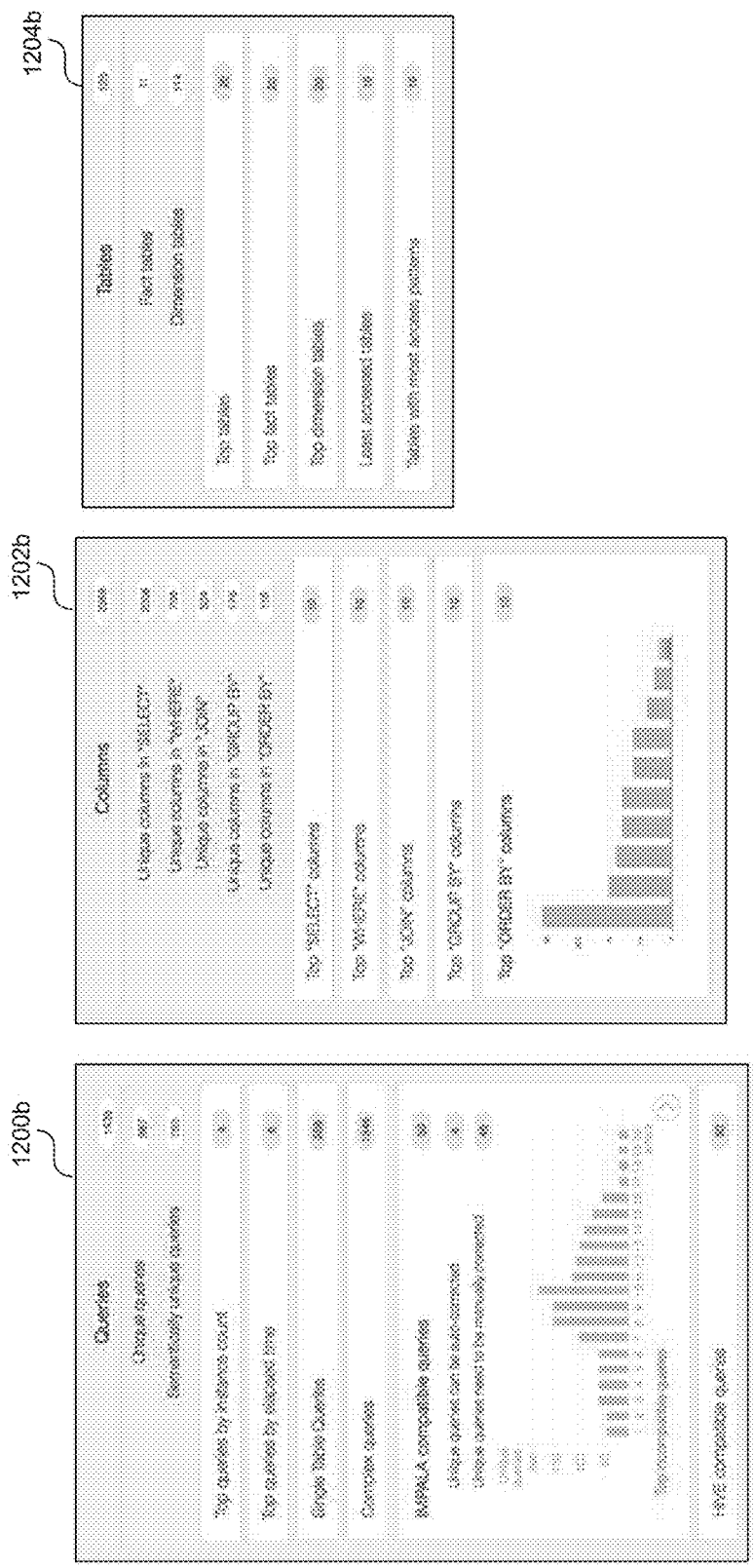
Figure 12C:
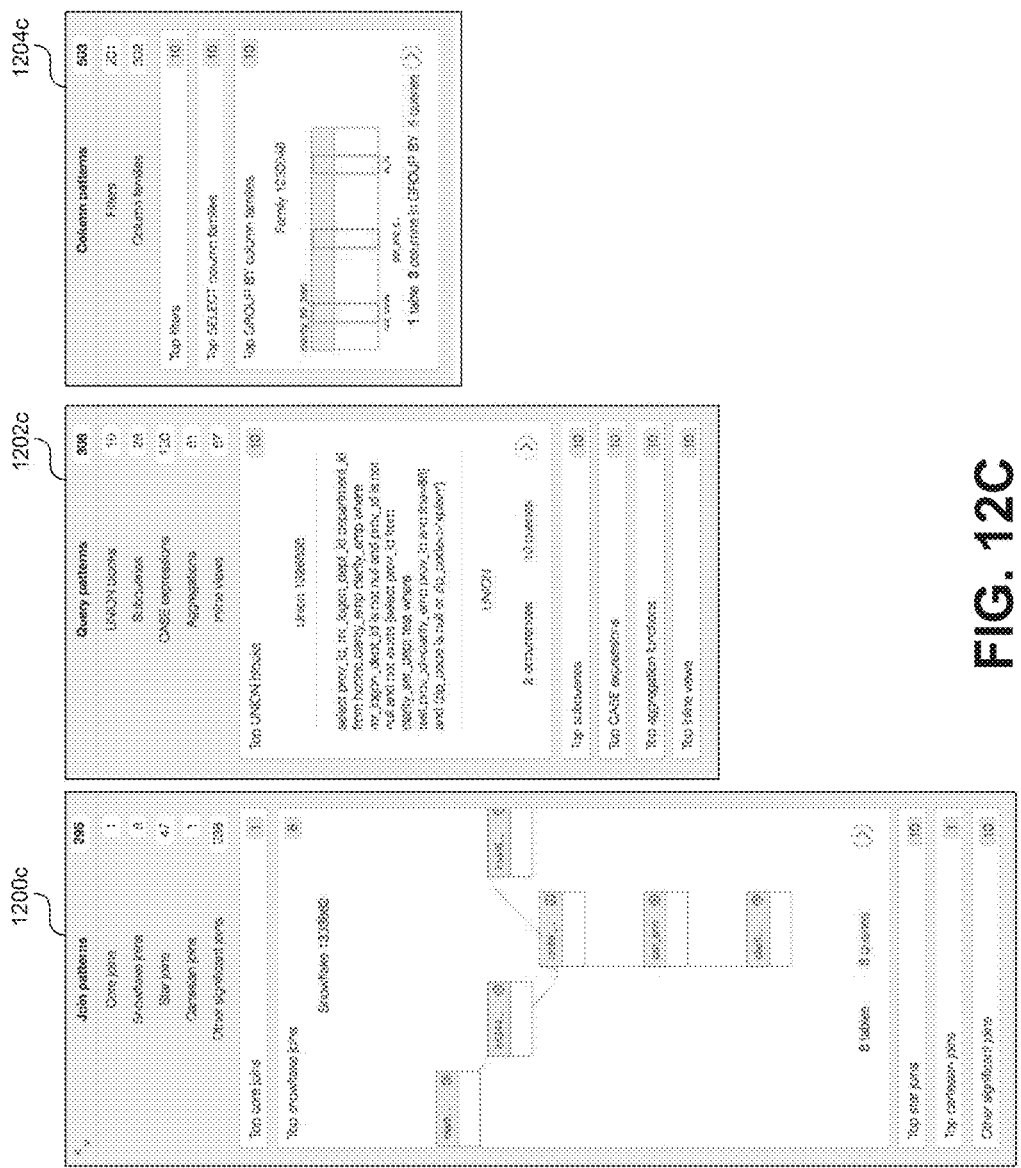

FIGS. 12A-12C show example accordion interface elements that can be used for displaying workload analysis insights, according to some embodiments. FIG. 12A shows an example interactive accordion box interface element 1200a displaying insights related to an identified join pattern. As shown in FIG. 12A, the accordion element 1200a includes summary information 1202a such as a count of the number of join operations (e.g. star and liner joins) that make up the pattern observed in the workload data 212. To provide further insight, the example accordion element 1200a also includes one or more expandable and collapsible sub elements 1204a, 1206a, 1208a, and 1210a. For example, element 1210a, which includes join diagrams for the core join patterns observed in the workload data 212, is displayed in FIG. 12A in an expanded state. Conversely elements 1204a. 1206a, and 1208a, which may include join diagrams for other categories of join patters (e.g. snowflake, star, linear, etc.) are displayed in FIG. 12A in a collapsed state. Elements 1204a-1210a can be expanded and collapsed in response to user interaction (e.g. through a mouse click or touch gesture). The example accordion box 1200a shown in FIG. 12A is provided to illustrate the concept of progressively displaying multiple insights through visual interface. FIGS. 12B and 12C show a series of alternative examples of accordion box interface elements (in differing states) for providing other workload assessment insights. For example, in FIG. 12B, example accordion element 1200b in shows insights regarding queries, element 1202b shows insights regarding columns, and element 1204b shows insights regarding tables, as observed in the workload data 212. In FIG. 12C, example accordion element 1200c shows insights regarding join patterns, element 1202c shows insights regarding union patterns, and element 1204c shows insights regarding column patterns.

Example Computer Processing System

Figure 13:
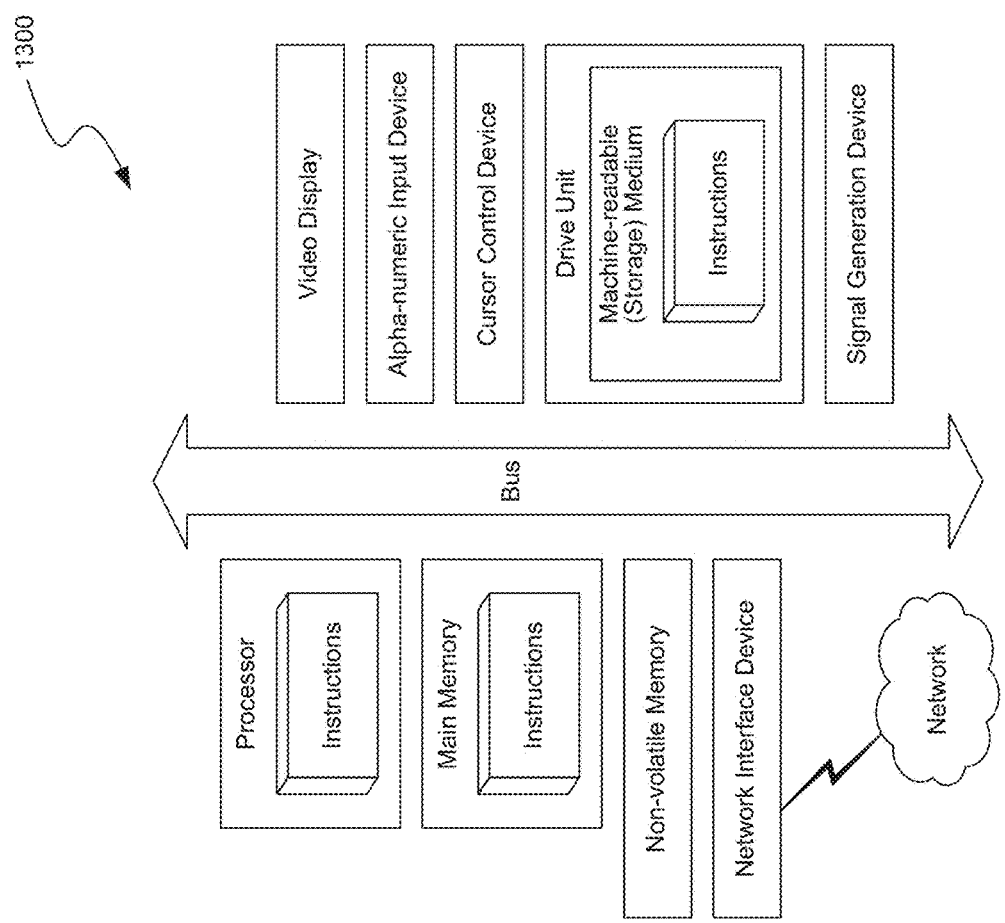
FIG. 13 is a diagram of an example computer system within which a set of instructions, for performing any one or more of the methodologies discussed herein, can be executed.

FIG. 13 is a diagram illustrating a machine 1300 in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine may be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed repository, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1200 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for causing display of a usage heatmap diagram indicative of usage of data stored in a data storage system, the method comprising:
   receiving workload data indicative of queries executed at the data storage system on the stored data;
   processing the workload data to identify a plurality of tables present in the stored data, each of the identified tables including one or more columns;
   processing the workload data to determine relationships between the identified tables based on operations performed during execution of the queries; and
   causing display of the usage heatmap diagram based on the processing, the usage heatmap diagram including:
      a plurality of table nodes representative of the identified plurality of tables, each of the plurality of table nodes visually linked to one or more of the other plurality of table nodes based on the determined relationships;
      wherein each of the plurality of table nodes is displayed as a graphical object in a color corresponding to relative usage of the represented table and includes a graphical listing of a plurality of column identifiers representative of a plurality of columns present in the represented table, each of the one or more column identifiers ordered based on relative usage of the represented columns and displayed in a color corresponding to a category of operation associated with usage of the represented columns.

2. A method for facilitating analysis of the usage of data stored in a data storage system without accessing the stored data, the method comprising:
   receiving workload data indicative of queries executed at the data storage system on the stored data;
   processing the workload data to identify a plurality of data elements associated with the stored data;
   processing the workload data to determine relationships between the identified plurality of data elements based on operations performed during execution of the queries; and
   causing display of an interactive visualization including a usage heatmap diagram based on the processing, the usage diagram including:
      a plurality of nodes representative of the plurality of data elements present in the stored data, each of the plurality of nodes visually linked to one or more of the other plurality of nodes based on the determined relationships between the plurality of data elements;
      wherein each of the plurality of nodes is displayed as a graphical object indicative of a relative usage of a corresponding data element.

3. The method of claim 2, wherein the workload data includes any of a query execution log or a data definition language (DDL) statement.

4. The method of claim 2, wherein the workload data includes timestamped machine-generated data resulting from execution of the queries.

5. The method of claim 2, wherein the identified data elements include any of a table, a column, or a view.

6. The method of claim 2, wherein
   each of the plurality of data elements is a table, and wherein each of the plurality of nodes includes:
   an identifier associated with the table; and
   a listing of column identifiers representative of columns present in the table, each of the column identifiers including information regarding usage of the columns.

7. The method of claim 6, wherein the identifier associated with the table includes any of:
   a name of the table; or
   an indication that the table is a fact table or a dimension table.

8. The method of claim 6, wherein a particular node representative of a particular table is visually represented as a rectangular box and wherein column identifiers representative of columns present in the particular table are visually represented as smaller rectangular boxes enclosed in the rectangular box representative of the particular table.

9. The method of claim 6, wherein a particular node representative of a particular table is visually represented as a rectangular graphical object of a particular color, wherein the particular color is indicative of any of:
  level of usage of columns present in the particular table; or
  a category of operation associated with usage of columns present in the particular table.

10. The method of claim 6, wherein a particular column identifier representative of a particular column present in a particular table is visually represented as a rectangular graphical object of a particular color, wherein the particular color is indicative of any of:
  level of usage of the particular column; or
  a category of operation associated with usage of the particular column.

11. The method of claim 6, wherein for a particular node representative of a particular table, the listed column identifiers representative of columns present in the particular table are ordered based on relative usage.

12. The method of claim 7, wherein a particular column identifier representative of a particular column includes any of:
  a name of the particular column;
  an indication of a category of operation associated with usage of the particular column; or
  statistical information regarding usage of the particular column.

13. The method of claim 6, wherein the information regarding usage of the columns includes an indication of a category of operation associated with usage of the columns, the category of usage selected from the following categories: "select," "filter," "group by," or "order by."

14. The method of claim 2, further comprising:
  causing display of an option to select from a plurality of categories of operation associated with usage of the stored data;
  receiving a user selection of a particular category of operation via the option; and
  dynamically updating display of the usage diagram in response to the selected particular category of operation.

15. The method of claim 6, further comprising:
  causing display of statistical information regarding usage of a particular column in response to detecting a user interaction with a particular column identifier in the usage heatmap diagram that is representative of the particular column.

16. The method of claim 2, wherein the interactive visualization further includes a join diagram, the join diagram including:
  a plurality of table nodes representative of a plurality of tables present in the stored data, each of the plurality of table nodes visually linked to one or more of the other plurality of table nodes based on inferred join relationships;
  wherein a particular inferred join relationship between a particular two or more of the plurality of table nodes is indicative of a level of query operations joining the particular two or more tables represented by the two or more table nodes as observed in the workload data.

17. The method of claim 16, further comprising:
  dynamically updating the join diagram to highlight the particular two or more nodes associated with a particular inferred join relationship in response to a user interaction with any of the particular two or more nodes.

18. The method of claim 16, further comprising:
  dynamically updating the join diagram to cause display of join key and/or a category of join operation associated with a particular inferred join relationship in response to a user interaction with any of the particular two or more nodes.

19. The method of claim 2, wherein the interactive visualization further includes a column family diagram, the column family diagram including:
  a graphical object representative of a table present in the stored data, the graphical object including a listing of column identifiers representative of columns present in the table and related to other columns by inferred aggregation relationships;
  wherein a particular inferred aggregation relationship between a particular two or more columns is indicative of a level of query operations aggregating the values of the particular two or more columns as observed in the workload data.

20. The method of claim 19, wherein the query operations aggregating values of the particular two or more columns include a "group by" query operation.

21. The method of claim 2, wherein the interactive visualization further includes a filter diagram, the filter diagram including:
  a graphical object representative of a data structure associated with the stored data; and
  a line bisecting the graphical object, the lines indicative of a filter operation applied to the data structure as observed in the workload data.

22. The method of claim 21, wherein the line bisecting the graphical object includes a value identifier indicative of a value associated with the filter operation.

23. The method of claim 2, wherein the interactive visualization further includes a view lineage diagram, the view lineage diagram including:
  a view node representative of a view upon which a query was executed at the data storage system; and
  plurality of table nodes representative of tables upon which the view depends, each of the plurality of table nodes visually linked to the view node.

24. The method of claim 2, wherein the interactive visualization further includes a data flow diagram, the data flow diagram including:
  a plurality of table nodes representative of a plurality of tables present in the stored data;
  a query node representative of one or more queries executed on the plurality of tables, the query node visually linked to the plurality of table nodes; and
  a transient table node representative of one or more transient tables generated as part of a processing pipeline during execution of one or more queries, the transient table nodes visually linked to the query node.

25. The method of claim 24, wherein the data flow diagram further includes:
  a second query node representative of one or more queries executed on the one or more transient tables, the second query node visually linked to the transient table node.

26. The method of claim 2, wherein the interactive visualization further includes a denormalization diagram, the denormalization diagram including:
  a plurality of table nodes representative of a plurality of tables present in the stored data, each of the plurality of table nodes visually linked to one or more of the other plurality of table nodes based on inferred join relationships;

wherein a particular inferred join relationship between a particular subset of the plurality of table nodes is indicative of a level of query operations joining the particular subset of tables represented by the two or more table nodes as observed in the workload data; and a denormalization recommendation to combine the particular subset of table nodes into fewer tables using an alternative data storage framework.

27. The method of claim 26, wherein denormalization recommendation includes an option to generate a code template for use in migrating stored data associated with the particular subset of table nodes into the alternative data storage framework.

28. The method of claim 26, wherein the alternative data storage framework is based on any of Hadoop, Impala, or Hive.

29. The method of claim 2, wherein the interactive visualization further includes a workload distribution diagram, the workload distribution diagram including:
a visual representation of a measure of the queries indicated in the workload data split according to one or more of the following categories:
originating user;
originating application;
originating report;
query complexity; or
compatibility with a target alternative data storage framework.

30. The method of claim 2, the interactive visualization includes a plurality of insights displayed via an interactive accordion box interface element, wherein each interface element is collapsible and expandable in response to user interaction, and wherein one or more of the interface elements display any of:
the usage diagram;
a join diagram;
a column family diagram;
a filter diagram;
a view lineage diagram;
a data flow diagram;
a denormalization diagram; or
a workload distribution diagram.

31. A system for facilitating analysis of the usage of data stored in a data storage system without accessing the stored data, the system comprising:
a processing unit; and
a memory coupled to the processing unit, the memory having instructions stored thereon, which when executed by the processing unit, cause the system to:
receive workload data indicative of queries executed at the data storage system on the stored data;
process the workload data to identify data elements associated with the stored data;
process the workload data to determine relationships between the identified plurality of data elements based on operations performed during execution of the queries; and
cause display of an interactive visualization including a usage diagram based on the processing, the usage diagram including:
a plurality of nodes representative of the plurality of data elements present in the stored data, each of the plurality of nodes visually linked to one or more of the other plurality of nodes based on the determined relationships between the plurality of data elements;
wherein each of the plurality of nodes is displayed as a graphical object indicative of a relative usage of a corresponding data element.

* * * * *